(12) United States Patent
Zhou et al.

(10) Patent No.: US 11,687,435 B2
(45) Date of Patent: Jun. 27, 2023

(54) PROGRAMMABLE STATE MACHINE FOR A HARDWARE PERFORMANCE MONITOR

(71) Applicant: NVIDIA CORPORATION, Santa Clara, CA (US)

(72) Inventors: Gongyu Zhou, Shanghai (CN); Shounak Kamalapurkar, Santa Clara, CA (US); Yogesh Kulkarni, Foster City, CA (US); Thomas Melvin Ogletree, Lakeway, TX (US); Abhijat Ranade, Austin, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 181 days.

(21) Appl. No.: 17/380,375

(22) Filed: Jul. 20, 2021

(65) Prior Publication Data

US 2023/0025021 A1    Jan. 26, 2023

(51) Int. Cl.
*G06F 9/44* (2018.01)
*G06F 11/34* (2006.01)
*G06F 11/30* (2006.01)

(52) U.S. Cl.
CPC ...... *G06F 11/3409* (2013.01); *G06F 11/3003* (2013.01)

(58) Field of Classification Search
CPC .................................................. G06F 11/3409
USPC ......................................................... 719/320
See application file for complete search history.

(56) References Cited

U.S. PATENT DOCUMENTS

| | | | |
|---|---|---|---|
| 9,400,657 B2 * | 7/2016 | Busaba | G06F 9/30076 |
| 2011/0078415 A1 * | 3/2011 | Johnson | G06F 9/3851 718/107 |
| 2014/0380317 A1 * | 12/2014 | Merrill | G06F 7/506 718/100 |
| 2019/0278574 A1 * | 9/2019 | Ravishankar | G06F 16/9024 |

* cited by examiner

*Primary Examiner* — Timothy A Mudrick
(74) *Attorney, Agent, or Firm* — Artegis Law Group, LLP

(57) ABSTRACT

A processing unit can include a performance monitor for monitoring the performance of the processing unit and associated sub-units. The performance monitor can include a state machine. The state machine can be implemented via state machine data entries stored in a memory associated with the performance monitor. A state machine data entry includes information indicating a state transition condition and output signals. The state transition condition includes a current state and input signals required to meet the condition. The output signals include a next state, one or more counter actions, and one or more triggers. The performance monitor implements logic circuits that determine, based on input signals and the state machine data entries, the next state to transition and associated output signals. The state machine data entries can be written and re-written by a user.

20 Claims, 12 Drawing Sheets

US 11,687,435 B2

PROGRAMMABLE STATE MACHINE FOR A HARDWARE PERFORMANCE MONITOR

BACKGROUND

Field of the Various Embodiments

Various embodiments relate generally to hardware monitoring and, more specifically, to a programmable state machine for a hardware performance monitor.

Description of the Related Art

A processing unit can include an integrated hardware-based performance monitor. The performance monitor can enable monitoring, profiling, and debugging of the performance of the processing unit. The performance monitor can implement a state machine, via which the performance monitor obtains a certain state based on the inputs into the performance monitor and performs certain operations associated with the state (e.g., output certain signals).

Typically, the state machine is implemented as fixed logic in the same hardware component as the performance monitor. The fixed-logic state machine takes in predetermined inputs from components within the processing unit and outputs predetermined outputs based on the inputs. A drawback of this approach is that the states and transitions of the state machine cannot be changed after the initial configuration. As a result, the state machine cannot be repaired if a bug in the state machine is found. Further, the state machine cannot be modified to take advantage of different input signal combinations for monitoring purposes.

As the foregoing illustrates, what is needed in the art are more effective approaches for operating a state machine for a hardware performance monitor.

SUMMARY

Various embodiments include a method, including receiving a set of one or more signals; generating a first input based on the set of one or more signals and a first input mask associated with a first state transition condition, wherein the first input mask and the first state transition condition are stored in a first data entry in a memory associated with a performance monitor; determining, based on the first input and a current state, that the first state transition condition is satisfied; and in response to determining that the first state transition condition is satisfied, transitioning the performance monitor from the current state to a first state, wherein the first state is stored in the memory and associated with the first state transition condition.

One technological advantage of the disclosed techniques relative to the prior art is that a state machine of a performance monitor can be more flexibly modified to add and/or repair functionality. Accordingly, new features and/or bug fixes can be more easily provided to deployed processing units, thereby avoiding disablement and/or abandonment of performance monitoring functionality or even entire processing units. Another technological advantage is that, because functionality and/or fixes are more easily provided, the feature divergence between different versions of the same hardware (e.g., between a manufacturing batch prior to a bug fix and a batch after the bug fix) is reduced. These technological advantages represent one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
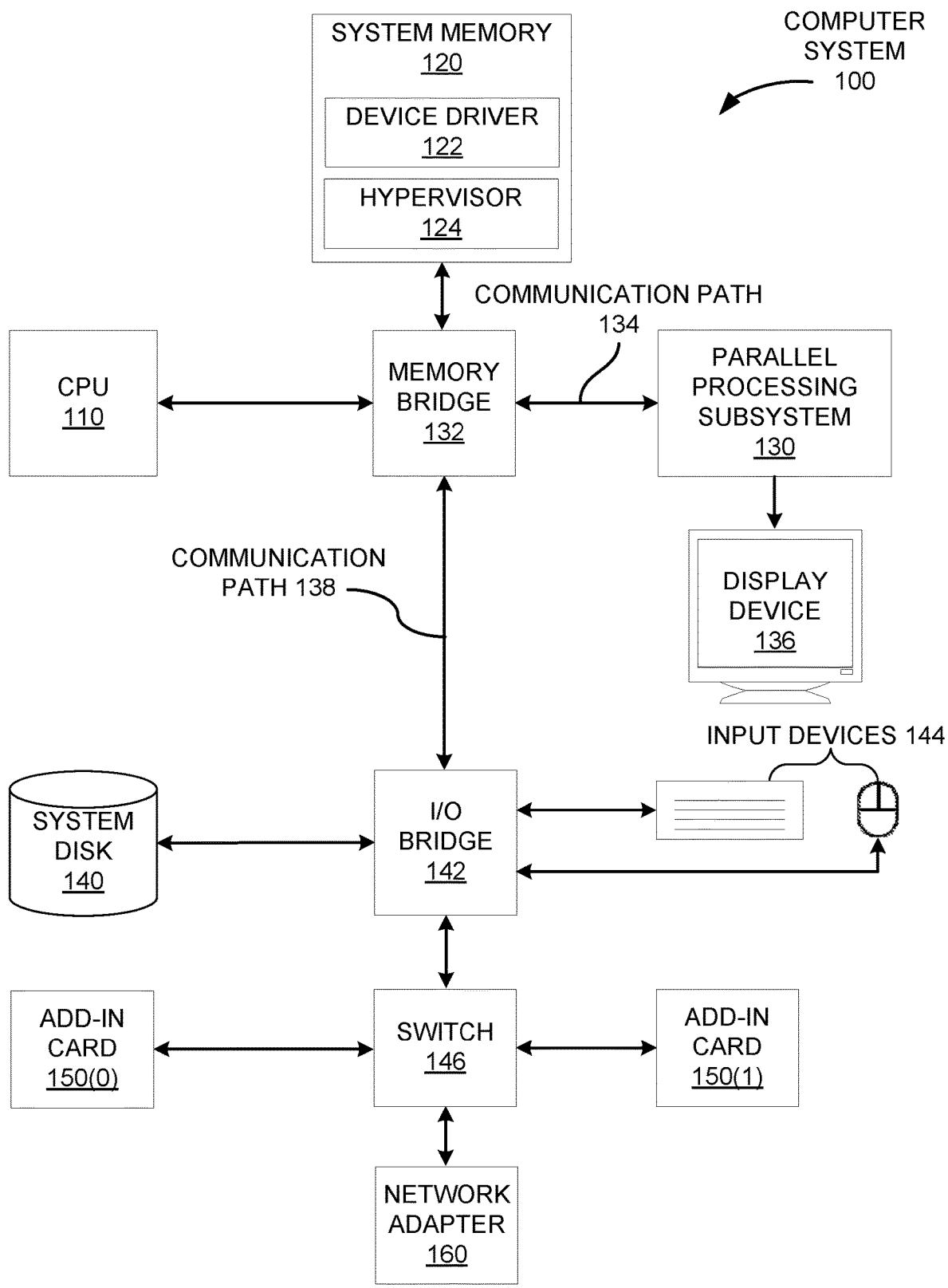
FIG. 1 is a block diagram of a computer system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

A processing unit can include one or more hardware performance monitors for monitoring and debugging units or components within the processor unit. A hardware performance monitor can implement a state machine to control operations of the performance monitor. The state machine can transition to a certain state based on inputs into the performance monitor and output certain signals based on the state. Those output signals can include, for example, action signals for controlling one or more counters, an indicator of the next state to which the state machine will transition, and/or various triggers (e.g., a design-for-debugging (DFD) trigger) to activate and/or deactivate certain functions within the performance monitor and/or other units.

In a conventional hardware performance monitor, the state machine is designed into, and fixed in, the hardware implementation of the performance monitor. Accordingly, the state machine has a fixed set of states and transitions. However, such fixing of the state machine makes the state machine hard to modify to add new functionality and/or to debug the state machine.

To address this and other drawbacks, various embodiments include a programmable state machine for a performance monitor. The programmable state machine includes information on states, transitions, and outputs that can be stored in a storage unit (e.g., a content-addressable memory). The programmable state machine operates by generating a state machine input based on a set of input signals and then processing the information stored in the storage unit based on the state machine input to determine the appropriate state, transition, and output. The information in the storage unit can be overwritten to include new information on states, transitions, and/or outputs.

Additionally, as noted above, a processing unit can have multiple performance monitors, and each performance monitor can include an internal logic analyzer. The performance monitor can have a storage unit for the performance monitor and a storage unit specific to the internal logic analyzer. With the duplication of similar performance monitor structures across the processing unit, the needed chip area for the processing unit could become quite large.

To address this and other drawbacks, various embodiments include an internal logic analyzer that shares a storage unit with the programmable state machine described above, and further can be triggered by the above-described programmable state machine. The internal logic analyzer can be triggered to start or stop collecting data by one or more output signals from one or more programmable state machines. The internal logic analyzer collects data and stores the data in the same storage unit as where the information for the programmable state machine is stored, overwriting that information.

One technological advantage of the disclosed techniques relative to the prior art is that, with the disclosed techniques, a state machine of a performance monitor can be more flexibly modified to add and/or repair functionality. Accordingly, new features and/or bug fixes can be easily provided to deployed processing units, thereby avoiding disablement and/or abandonment of performance monitoring functionality or even entire processing units. Another technological advantage is that, because functionality and/or fixes for the state machine are easily provided, the feature divergence between different versions of the same hardware (e.g., between a manufacturing batch prior to a bug fix and a batch after the bug fix) is reduced. A further technological advantage of the disclosed techniques is that, because the internal logic analyzer shares a storage unit with programmable state machine, the required chip area for implementing the internal logic analyzer in the performance monitor is reduced. These technological advantages represent one or more technological advancements over prior art approaches.

System Overview

FIG. 1 is a block diagram of a computer system configured to implement one or more aspects of the present invention. As shown, computer system 100 includes a central processing unit (CPU) 110, a system memory 120, and a parallel processing subsystem 130, coupled together via a memory bridge 132. Parallel processing subsystem 130 is coupled to memory bridge 132 via a communication path 134. One or more display devices 136 can be coupled to parallel processing subsystem 130. Computer system 100 further includes a system disk 140, one or more add-in cards 150, and a network adapter 160. System disk 140 is coupled to an I/O bridge 142. I/O bridge 142 is coupled to memory bridge 132 via communication path 144 and is also coupled to input devices 146. Add-in card(s) 150 and network adapter 160 are coupled together via a switch 148 that, in turn, is coupled to I/O bridge 142.

Memory bridge 132 is a hardware unit that facilitates communications between CPU 110, system memory 120, and parallel processing subsystem 130, among other components of computer system 100. For example, memory bridge 132 could be a Northbridge chip. Communication path 134 is a high speed and/or high bandwidth data connection that facilitates low-latency communications between parallel processing subsystem 130 and memory bridge 132 across one or more separate lanes. For example, communication path 134 could be a peripheral component interconnect express (PCIe) link, an Accelerated Graphics Port (AGP), a HyperTransport, or any other technically feasible type of communication bus.

I/O bridge 142 is a hardware unit that facilitates input and/or output operations performed with system disk 140, input devices 146, add-in card(s) 150, network adapter 160, and various other components of computer system 100. For example, I/O bridge 143 could be a Southbridge chip. Communication path 144 is a high speed and/or high bandwidth data connection that facilitates low-latency communications between memory bridge 132 and I/O bridge 142. For example, communication path 142 could be a PCIe link, an AGP, a HyperTransport, or any other technically feasible type of communication bus. With the configuration shown, any component coupled to either memory bridge 132 or I/O bridge 142 can communicate with any other component coupled to either memory bridge 132 or I/O bridge 142.

CPU 110 is a processor that is configured to coordinate the overall operation of computer system 100. In so doing, CPU 110 executes instructions in order to issue commands to the various other components included in computer system 100. CPU 110 is also configured to execute instructions in order to process data that is generated by and/or stored by any of the other components included in computer system 100, including system memory 120 and system disk 140. System memory 120 and system disk 140 are storage devices that include computer-readable media configured to store data and software applications. System memory 120 includes a device driver 122 and a hypervisor 124, the operation of which is described in greater detail below. Parallel processing subsystem 130 includes one or more parallel processing units (PPUs) that are configured to execute multiple operations simultaneously via a highly parallel processing architecture. Each PPU includes one or more compute engines that perform general-purpose compute operations in a parallel manner and/or one or more graphics engines that perform graphics-oriented operations in a parallel manner. A given PPU can be configured to generate pixels for display via display device 136. An exemplary PPU is described in greater detail below in conjunction with FIGS. 2-4.

Device driver 122 is a software application that, when executed by CPU 110, operates as an interface between CPU 110 and parallel processing subsystem 130. In particular, device driver 122 allows CPU 110 to offload various processing operations to parallel processing subsystem 130 for highly parallel execution, including general-purpose compute operations as well as graphics processing operations. Hypervisor 124 is a software application that, when executed by CPU 110, partitions various compute, graphics, and memory resources included in parallel processing subsystem 130 in order to provide separate users with independent usage of those resources.

In various embodiments, some or all components of computer system 100 may be implemented in a cloud-based environment that is potentially distributed across a wide geographical area. For example, various components of computer system 100 could be deployed across geographically disparate data centers. In such embodiments, the various components of computer system 100 may communicate with one another across one or more networks, including any number of local intranets and/or the Internet. In various other embodiments, certain components of computer system 100 may be implemented via one or more virtualized devices. For example, CPU 110 could be implemented as a virtualized instance of a hardware CPU. In some embodiments, some or all of parallel processing subsystem 130 may be integrated with one or more other components of computer system 100 in order to form a single chip, such as a system-on-chip (SoC).

Persons skilled in the art will understand that the architecture of computer system 100 is sufficiently flexible to be implemented across a wide range of potential scenarios and use-cases. For example, computer system 100 could be implemented in a cloud-computing center to expose general-purpose compute capabilities and/or general-purpose graphics processing capabilities to one or more users. Alternatively, computer system 100 could be deployed in an automotive implementation in order to perform data processing operations associated with vehicle navigation. Persons skilled in the art will further understand that the various components of computer system 100 and the connection topology between those components can be modified in any technically feasible manner without departing from the overall scope and spirit of the present embodiments.

Figure 2:
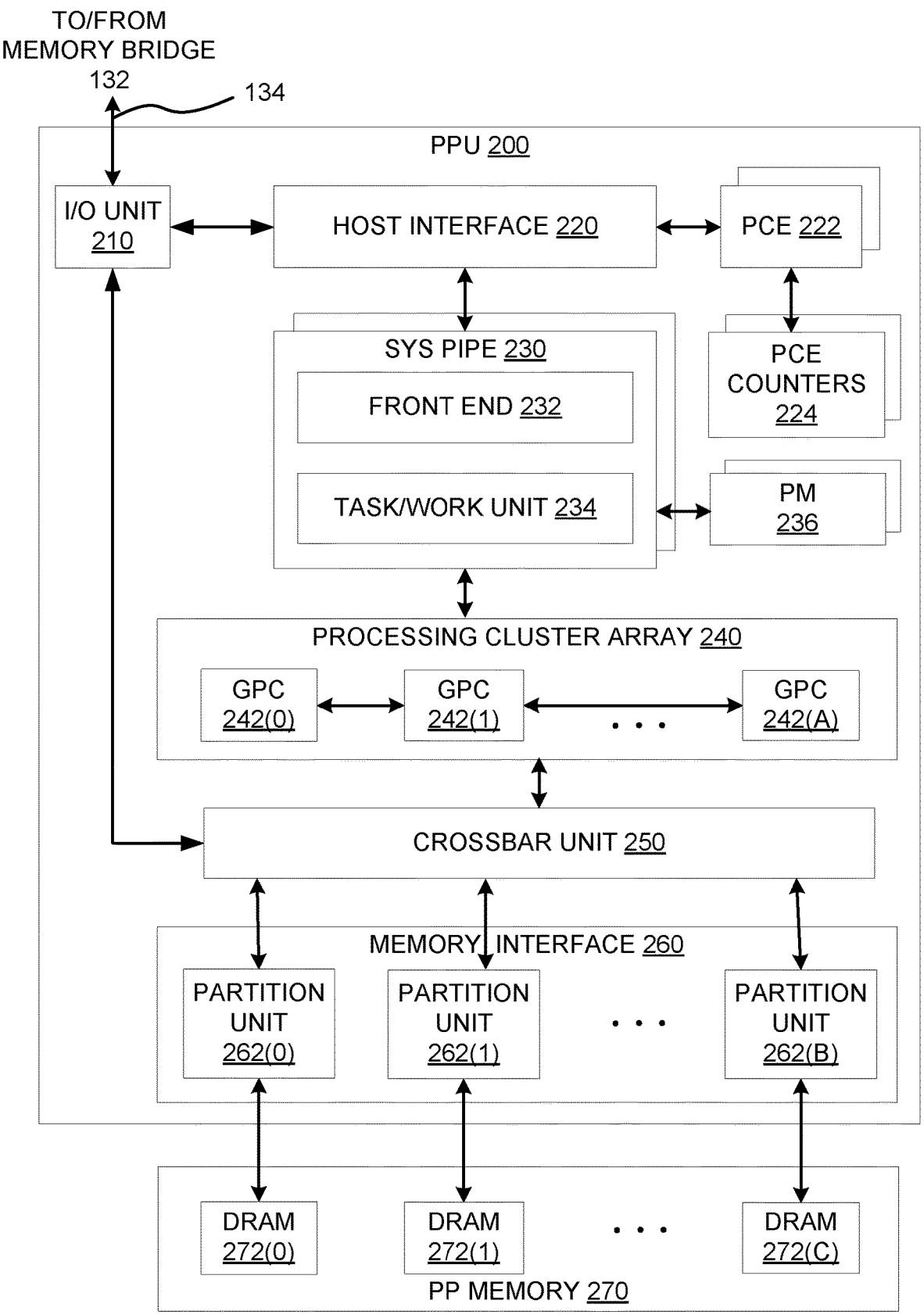
FIG. 2 is a block diagram of a parallel processing unit (PPU) included in the parallel processing subsystem of FIG. 1, according to various embodiments.

FIG. 2 is a block diagram of a PPU included in the parallel processing subsystem of FIG. 1, according to various embodiments. As shown, a PPU 200 includes an I/O unit 210, a host interface 220, sys pipes 230, a processing cluster array 240, a crossbar unit 250, and a memory interface 260. PPU 200 is coupled to a PPU memory 270. Each of the components shown can be implemented via any technically feasible type of hardware and/or any technically feasible combination of hardware and software.

I/O unit 210 is coupled via communication path 134 and memory bridge 132 to CPU 110 of FIG. 1. I/O unit 210 is also coupled to host interface 220 and to crossbar unit 250. Host interface 220 is coupled to one or more physical copy engines (PCEs) 222 that are in turn coupled to one or more PCE counters 224. Host interface 220 is also coupled to sys pipes 230. A given sys pipe 230 includes a front end 232, a task/work unit 234, and a performance monitor (PM) 236 and is coupled to processing cluster array 240. Processing cluster array 240 includes general processing clusters (GPCs) 242(0) through 242(A), where A is a positive integer. Processing cluster array 240 is coupled to crossbar unit 250. Crossbar unit 250 is coupled to memory interface 260. Memory interface 260 includes partition units 262(0) through 262(B), where B is a positive integer value. Each partition unit 262 can be separately connected to crossbar unit 250. PPU memory 270 includes dynamic random access memory (DRAMs) 272(0) through 272(C), where C is a positive integer value. To facilitate operating simultaneously on multiple processing contexts, various units within the PPU 200 are replicated as follows: (a) host interface 220 includes the PBDMAs 520(0) through 520(7); (b) sys pipe 230 including sys pipe 230(0) through 230(7), such that task/work unit 234 corresponds to SKED 500(0) through SKED 500(7); and task/work unit 234 corresponds to CWD 560(0) through 560(7).

In operation, I/O unit 210 obtains various types of command data from CPU 110 and distributes this command data to relevant components of PPU 200 for execution. In particular, I/O unit 210 obtains command data associated with processing tasks from CPU 110 and routes this command data to host interface 220. I/O unit 210 also obtains command data associated with memory access operations from CPU 110 and routes this command data to crossbar unit 250. Command data related to processing tasks generally includes one or more pointers to task metadata (TMD) that is stored in a command queue within PPU memory 270 or elsewhere within computer system 100. A given TMD is an encoded processing task that describes indices of data to be processed, operations to be executed on that data, state parameters associated with those operations, an execution priority, and other processing task-oriented information.

Host interface 220 receives command data related to processing tasks from I/O unit 210 then distributes this command data to sys pipes 230 via one or more command streams. In some configurations, host interface 210 generates a different command stream for each different sys pipe 230, where a given command stream includes pointers to TMDs relevant to a corresponding sys pipe 230.

A given sys pipe 230 performs various pre-processing operations with received command data to facilitate the execution of corresponding processing tasks on GPCs 242 within processing cluster array 240. Upon receipt of command data associated with one or more processing tasks, front end 232 within the given sys pipe 230 obtains the associated processing tasks and relays those processing tasks to task/work unit 234. Task/work unit 234 configures one or more GPCs 242 to an operational state appropriate for the execution of the processing tasks and then transmits the processing tasks to those GPCs 242 for execution. Each sys pipe 230 can offload copy tasks to one or more PCEs 222 that perform dedicated copy operations. PCE counters 224 track the usage of PCEs 222 in order to balance copy operation workloads between different sys pipes 230. PM 236 monitors the overall performance and/or resource consumption of the corresponding sys pipe 230 and can throttle various operations performed by that sys pipe 230 in order to maintain balanced resource consumption across all sys pipes 230.

Each GPC 242 includes multiple parallel processing cores capable of executing a large number of threads concurrently and with any degree of independence and/or isolation from other GPCs 242. For example, a given GPC 242 could execute hundreds or thousands of concurrent threads in conjunction with, or in isolation from, any other GPC 242. A set of concurrent threads executing on a GPC 242 may execute separate instances of the same program or separate instances of different programs. In some configurations, GPCs 242 are shared across all sys pipes 230, while in other configurations, different sets of GPCs 242 are assigned to operate in conjunction with specific sys pipes 230. Each GPC 242 receives processing tasks from one or more sys pipes 230 and, in response, launches one or more sets of threads in order execute those processing tasks and generate output data. Upon completion of a given processing task, a given GPC 242 transmits the output data to another GPC 242 for further processing or to crossbar unit 250 for appropriate routing. An exemplary GPC is described in greater detail below in conjunction with FIG. 3.

Crossbar unit 250 is a switching mechanism that routes various types of data between I/O unit 210, processing cluster array 240, and memory interface 260. As mentioned above, I/O unit 210 transmits command data related to memory access operations to crossbar unit 250. In response, crossbar unit 250 submits the associated memory access operations to memory interface 260 for processing. In some cases, crossbar unit 250 also routes read data returned from memory interface 260 back to the component requesting the read data. Crossbar unit 250 also receives output data from GPCs 242, as mentioned above, and can then route this output data to I/O unit 210 for transmission to CPU 110 or route this data to memory interface 260 for storage and/or processing. Crossbar unit 250 is generally configured to route data between GPCs 242 and from any GPC 242 to any partition unit 262. In various embodiments, crossbar unit 250 may implement virtual channels to separate traffic streams between the GPCs 242 and partition units 262. In various embodiments, crossbar unit 250 may allow non-shared paths between a set of GPCs 242 and set of partition units 262.

Memory interface 260 implements partition units 262 to provide high-bandwidth memory access to DRAMS 272 within PPU memory 270. Each partition unit 262 can perform memory access operations with a different DRAM 272 in parallel with one another, thereby efficiently utilizing the available memory bandwidth of PPU memory 270. A given partition unit 262 also provides caching support via one or more internal caches. An exemplary partition unit 262 is described in greater detail below in conjunction with FIG. 4.

PPU memory 270 in general, and DRAMs 272 in particular, can be configured to store any technically feasible type of data associated with general-purpose compute applications and/or graphics processing applications. For example, DRAMs 272 could store large matrices of data values associated with neural networks in general-purpose compute applications or, alternatively, store one or more frame buffers that include various render targets in graphics processing applications. In various embodiments, DRAMs 272 may be implemented via any technically feasible storage device.

The architecture set forth above allows PPU 200 to perform a wide variety of processing operations in an expedited manner and asynchronously relative to the operation of CPU 110. In particular, the parallel architecture of PPU 200 allows a vast number of operations to be performed in parallel and with any degree of independence from one another and from operations performed on CPU 110, thereby accelerating the overall performance of those operations.

In one embodiment, PPU 200 may be configured to perform general-purpose compute operations in order to expedite calculations involving large data sets. Such data sets may pertain to financial time series, dynamic simulation data, real-time sensor readings, neural network weight matrices and/or tensors, and machine learning parameters, among others. In another embodiment, PPU 200 may be configured to operate as a graphics processing unit (GPU) that implements one or more graphics rendering pipelines to generate pixel data based on graphics commands generated by CPU 110. PPU 200 may then output the pixel data via display device 136 as one or more frames. PPU memory 170 may be configured to operate as a graphics memory that stores one or more frame buffers and/or one or more render targets, in like fashion as mentioned above. In yet another embodiment, PPU 200 may be configured to perform both general-purpose compute operations and graphics processing operations simultaneously. In such configurations, one or more sys pipes 230 can be configured to implement general-purpose compute operations via one or more GPCs 242 and one or more other sys pipes 230 can be configured to implement one or more graphics processing pipelines via one or more GPCs 242.

With any of the above configurations, device driver 122 and hypervisor 124 interoperate in order to subdivide various compute, graphics, and memory resources included in PPU 200 into separate "PPU partitions." Alternatively, there can be a plurality of device drivers 122, each associated with a "PPU partition". Preferably, device drivers execute on a set of cores in the CPU 110. A given PPU partition operates in a substantially similar manner to PPU 200 as a whole. In particular, each PPU partition may be configured to perform general-purpose compute operations, graphics processing operations, or both types of operations in relative isolation from other PPU partitions. In addition, a given PPU partition may be configured to implement multiple processing contexts simultaneously when simultaneously executing one or more virtual machines (VMs) on the compute, graphics, and memory resources allocated to the given PPU partition.

Figure 3:
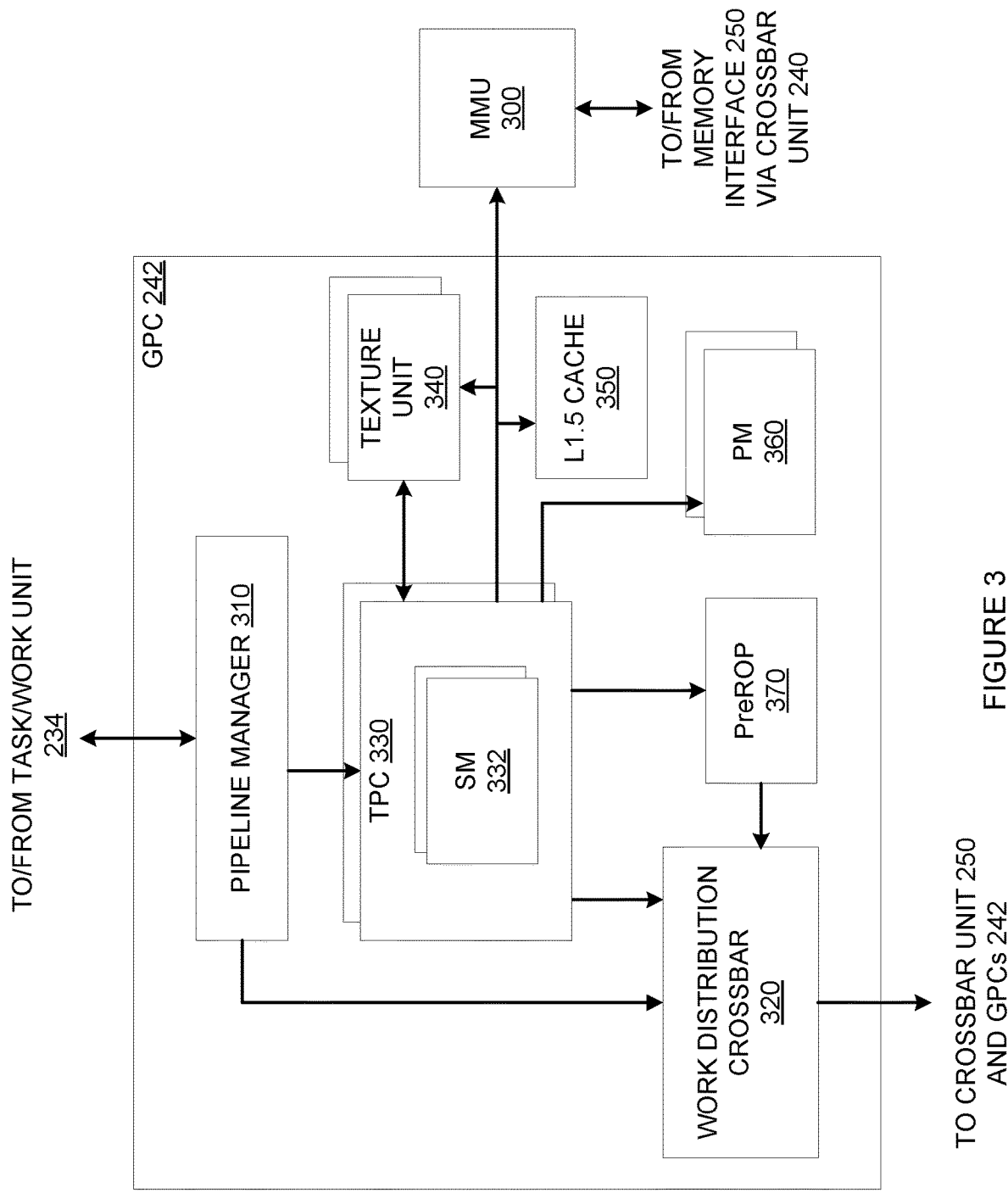
FIG. 3 is a block diagram of a general processing cluster included in the parallel processing unit of FIG. 2, according to various embodiments.

FIG. 3 is a block diagram of a GPC included in the PPU of FIG. 2, according to various embodiments of the present invention. As shown, GPC 242 is coupled to a memory management unit (MMU) 300 and includes a pipeline manager 310, a work distribution crossbar 320, one or more texture processing clusters (TPCs) 330, one or more texture units 340, a level 1.5 (L1.5) cache 350, a PM 360, and a pre-raster operations processor (preROP) 370. Pipeline manager 310 is coupled to work distribution crossbar 320 and TPCs 330. Each TPC 330 includes one or more streaming multiprocessors (SMs) 332 and is coupled to texture unit 340, MMU 300, L1.5 cache 350, PM 360, and preROP 370. Texture unit 340 and L1.5 cache 350 are also coupled to MMU 300 and to one another. PreROP 370 is coupled to work distribution crossbar 320. Each of the components shown can be implemented via any technically feasible type of hardware and/or any technically feasible combination of hardware and software.

GPC 242 is configured with a highly parallel architecture that supports the execution a large number of threads in parallel. As referred to herein, a "thread" is an instance of a particular program executing on a particular set of input data to perform various types of operations, including general-purpose compute operations and graphics processing operations. In one embodiment, GPC 242 may implement single-instruction multiple-data (SIMD) techniques to support parallel execution of a large number of threads without necessarily relying on multiple independent instruction units.

In another embodiment, GPC 242 may implement single-instruction multiple-thread (SIMT) techniques to support parallel execution of a large number of generally synchronized threads via a common instruction unit that issues instructions to one or more processing engines. Persons skilled in the art will understand that SIMT execution allows different threads to more readily follow divergent execution paths through a given program, unlike SIMD execution where all threads generally follow non-divergent execution paths through a given program. Persons skilled in the art will recognize that SIMD techniques represent a functional subset of SIMT techniques.

GPC 242 can execute large numbers of parallel threads via SMs 332 included in TPCs 330. Each SM 332 includes a set of functional units (not shown), including one or more execution units and/or one or more load-store units, configured to execute instructions associated with received processing tasks. A given functional unit can execute instructions in a pipelined manner, meaning that an instruction can be issued to the functional unit before the execution of a previous instruction has completed. In various embodiments, the functional units within SMs 332 can be configured to perform a variety of different operations including integer and floating point arithmetic (e.g., addition and multiplication, among others), comparison operations, Boolean operations (e.g. AND, OR, and XOR, among others), bit shifting, and computation of various algebraic functions (e.g., planar interpolation and trigonometric, exponential, and logarithmic functions, among others). Each functional unit can store intermediate data within a level-1 (L1) cache that resides in SM 332.

Via the functional units described above, SM 332 is configured to process one or more "thread groups" (also referred to as "warps") that concurrently execute the same program on different input data. Each thread within a thread group generally executes via a different functional unit, although not all functional units execute threads in some situations. For example, if the number of threads included in the thread group is less than the number of functional units, then the unused functional units could remain idle during processing of the thread group. In other situations, multiple threads within a thread group execute via the same functional unit at different times. For example, if the number of threads included in the thread group is greater than the number of functional units, then one or more functional units could execute different threads over consecutive clock cycles.

In one embodiment, a set of related thread groups may be concurrently active in different phases of execution within SM 332. A set of related thread groups is referred to herein as a "cooperative thread array" (CTA) or a "thread array." Threads within the same CTA or threads within different CTAs can generally share intermediate data and/or output data with one another via one or more L1 caches included those SMs 332, L1.5 cache 350, one or more L2 caches shared between SMs 332, or via any shared memory, global memory, or other type of memory resident on any storage device included in computer system 100. In one embodiment, L1.5 cache 350 may be configured to cache instructions that are to be executed by threads executing on SMs 332.

Each thread in a given thread group or CTA is generally assigned a unique thread identifier (thread ID) that is accessible to the thread during execution. The thread ID assigned to a given thread can be defined as a one-dimensional or multi-dimensional numerical value. Execution and processing behavior of the given thread may vary depending on the thread ID. For example, the thread could determine which portion of an input data set to process and/or which portion of an output data set to write based on the thread ID.

In one embodiment, a sequence of per-thread instructions may include at least one instruction that defines cooperative behavior between a given thread and one or more other threads. For example, the sequence of per-thread instructions could include an instruction that, when executed, suspends the given thread at a particular state of execution until some or all of the other threads reach a corresponding state of execution. In another example, the sequence of per-thread instructions could include an instruction that, when executed, causes the given thread to store data in a shared memory to which some or all of the other threads have access. In yet another example, the sequence of per-thread instructions could include an instruction that, when executed, causes the given thread to atomically read and update data stored in a shared memory to which some or all of the other threads may have access, depending on the thread IDs of those threads. In yet another example, the sequence of per-thread instructions could include an instruction that, when executed, causes the given thread to compute an address in a shared memory based on a corresponding thread ID in order to read data from that shared memory. With the above synchronization techniques, a first thread can write data to a given location in a shared memory and a second thread can read that data from the shared memory in a predictable manner. Accordingly, threads can be configured to implement a wide variety of data sharing patterns within a given thread group or a given CTA or across threads in different thread groups or different CTAs. In various embodiments, a software application written in the compute unified device architecture (CUDA) programming language describes the behavior and operation of threads executing on GPC 242, including any of the above-described behaviors and operations.

In operation, pipeline manager 310 generally coordinates the parallel execution of processing tasks within GPC 242. Pipeline manager 310 receives processing tasks from task/work unit 234 and distributes those processing tasks to TPCs 330 for execution via SMs 332. A given processing task is generally associated with one or more CTAs that can be executed on one more SMs 332 within one or more TPCs 330. In one embodiment, a given task/work unit 234 may distribute one or more processing tasks to GPC 242 by launching one or more CTAs that are directed to one or more specific TPCs 330. Pipeline manager 310 may receive the launched CTA from task/work unit 234 and transfer the CTA to the relevant TPC 330 for execution via one or more SMs 332 included in the TPC 330. During or after execution of a given processing task, each SM 332 generates output data and transmits the output data to various locations depending on a current configuration and/or the nature of the current processing task.

In configurations related to general-purpose computing or graphics processing, SM 332 can transmit output data to work distribution crossbar 320 and work distribution crossbar 320 then routes the output data to one or more GPCs 242 for additional processing or routes the output data to crossbar unit 250 for further routing. Crossbar unit 250 can route the output data to an L2 cache included in a given partition unit 262, to PPU memory 270, or to system memory 120, among other destinations. Pipeline manager 310 generally coordinates the routing of output data performed by work distribution crossbar 320 based on the processing tasks associated with that output data.

In configurations specific to graphics processing, SM 332 can transmit output data to texture unit 340 and/or preROP 370. In some embodiments, preROP 370 can implement some or all of the raster operations specified in a 3D graphics API, in which case preROP 370 implements some or all of the operations otherwise performed via a ROP 410. Texture unit 340 generally performs texture mapping operations, including, for example, determining texture sample positions, reading texture data, and filtering texture data among others. PreROP 370 generally performs raster-oriented operations, including, for example, organizing pixel color data and performing optimizations for color blending. PreROP 370 can also perform address translations and direct output data received from SMs 332 to one or more raster operation processor (ROP) units within partition units 262.

In any of the above configurations, one or more PMs 360 monitor the performance of the various components of GPC 242 in order to provide performance data to users, and/or balance the utilization of compute, graphics, and/or memory resources across groups of threads, and/or balance the utilization of those resources with that of other GPCs 242. Further, in any of the above configurations, SM 332 and other components within GPC 242 may perform memory access operations with memory interface 260 via MMU 300. MMU 300 generally writes output data to various memory spaces and/or reads input data from various memory spaces on behalf GPC 242 and the components included therein. MMU 300 is configured to map virtual addresses into physical addresses via a set of page table entries (PTEs) and one or more optional address translation lookaside buffers (TLBs). MMU 300 can cache various data in L1.5 cache 350, including read data returned from memory interface 260. In the embodiment shown, MMU 300 is coupled externally to GPC 242 and may potentially be shared with other GPCs 242. In other embodiments, GPC 242 may include a dedicated instance of MMU 300 that provides access to one or more partition units 262 included in memory interface 260.

Figure 4:
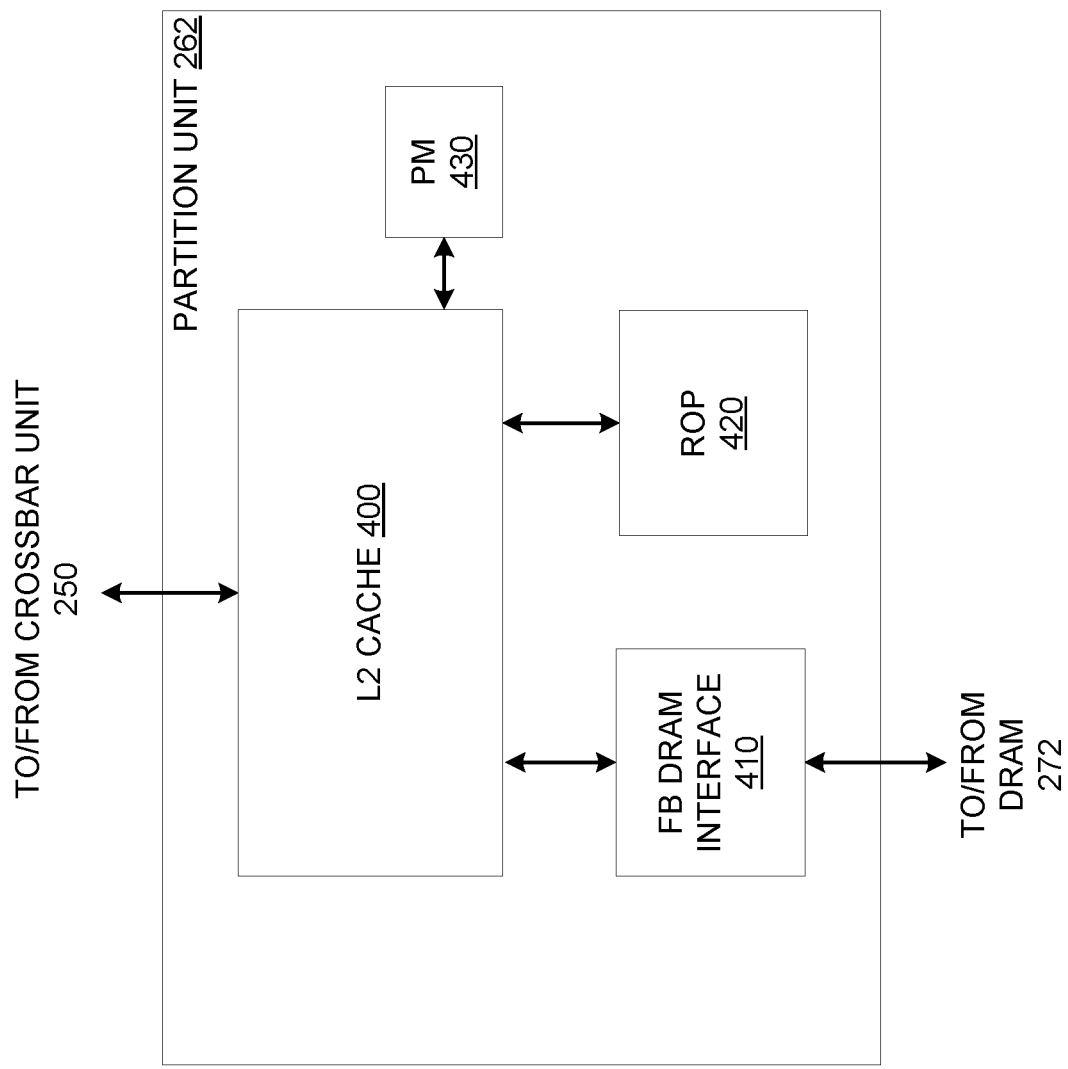
FIG. 4 is a block diagram of a partition unit included in the PPU of FIG. 2, according to various embodiments.

FIG. 4 is a block diagram of a partition unit 262 included in the PPU 200 of FIG. 2, according to various embodiments. As shown, partition unit 262 includes an L2 cache 400, a frame buffer (FB) DRAM interface 410, a raster operations processor (ROP) 420, and one or more PMs 430. L2 cache 400 is coupled between FB DRAM interface 410, ROP 420, and PM 430.

L2 cache 400 is a read/write cache that performs load and store operations received from crossbar unit 250 and ROP 420. L2 cache 400 outputs read misses and urgent writeback requests to FB DRAM interface 410 for processing. L2 cache 400 also transmits dirty updates to FB DRAM interface 410 for opportunistic processing. In some embodiments, during operation, PMs 430 monitor utilization of L2 cache 400 in order to fairly allocate memory access bandwidth across different GPCs 242 and other components of PPU 200. FB DRAM interface 410 interfaces directly with specific DRAM 272 to perform memory access operations, including writing data to and reading data from DRAM 272. In some embodiments, the set of DRAMs 272 is divided among multiple DRAM chips, where portions of multiple DRAM chips correspond to each DRAM 272.

In configurations related to graphics processing, ROP 420 performs raster operations to generate graphics data. For example, ROP 420 could perform stencil operations, z test operations, blending operations, and compression and/or decompression operations on z or color data, among others. ROP 420 can be configured to generate various types of graphics data, including pixel data, graphics objects, fragment data, and so forth. ROP 420 can also distribute graphics processing tasks to other computational units. In one embodiment, each GPC 242 includes a dedicated ROP 420 that performs raster operations on behalf of the corresponding GPC 242.

Persons skilled in the art will understand that the architecture described in FIGS. 1-4 in no way limits the scope of the present embodiments and that the techniques disclosed herein may be implemented on any properly configured processing unit, including, without limitation, one or more CPUs, one or more multi-core CPUs, one or more PPUs 200, one or more GPCs 242, one or more GPUs or other special purpose processing units, and so forth, without departing from the scope and spirit of the present embodiments.

Performance Monitoring System

As further discussed herein, performance monitors (PMs), such as PM 236 of FIG. 2, PM 360 of FIG. 3, and PM 430 of FIG. 4, monitor the overall performance and/or resource consumption of the corresponding components included in PPU 200. The performance monitors (PMs) are included in a performance monitoring system that provides performance monitoring and profiling across multiple domains (e.g., each of multiple sys pipes 230, each of multiple TPCs 330, and/or L2 cache 400). The performance monitoring system can simultaneously or substantially simultaneously profile multiple VMs and processing contexts executing in the VMs. The performance monitoring system can isolate the multiple VMs and multiple processing contexts executing in the VMs from each other with respect to how performance data is generated and captured, in order to prevent leakage of performance data between VMs. PMs 232 and associated counters within the performance data monitoring system can track attribution of performance data. The performance monitoring system can simultaneously profile compute engines and graphics engines, and profiles VMs as the VMs migrate to other PPUs 200. The performance monitoring system is now described.

Figure 5:
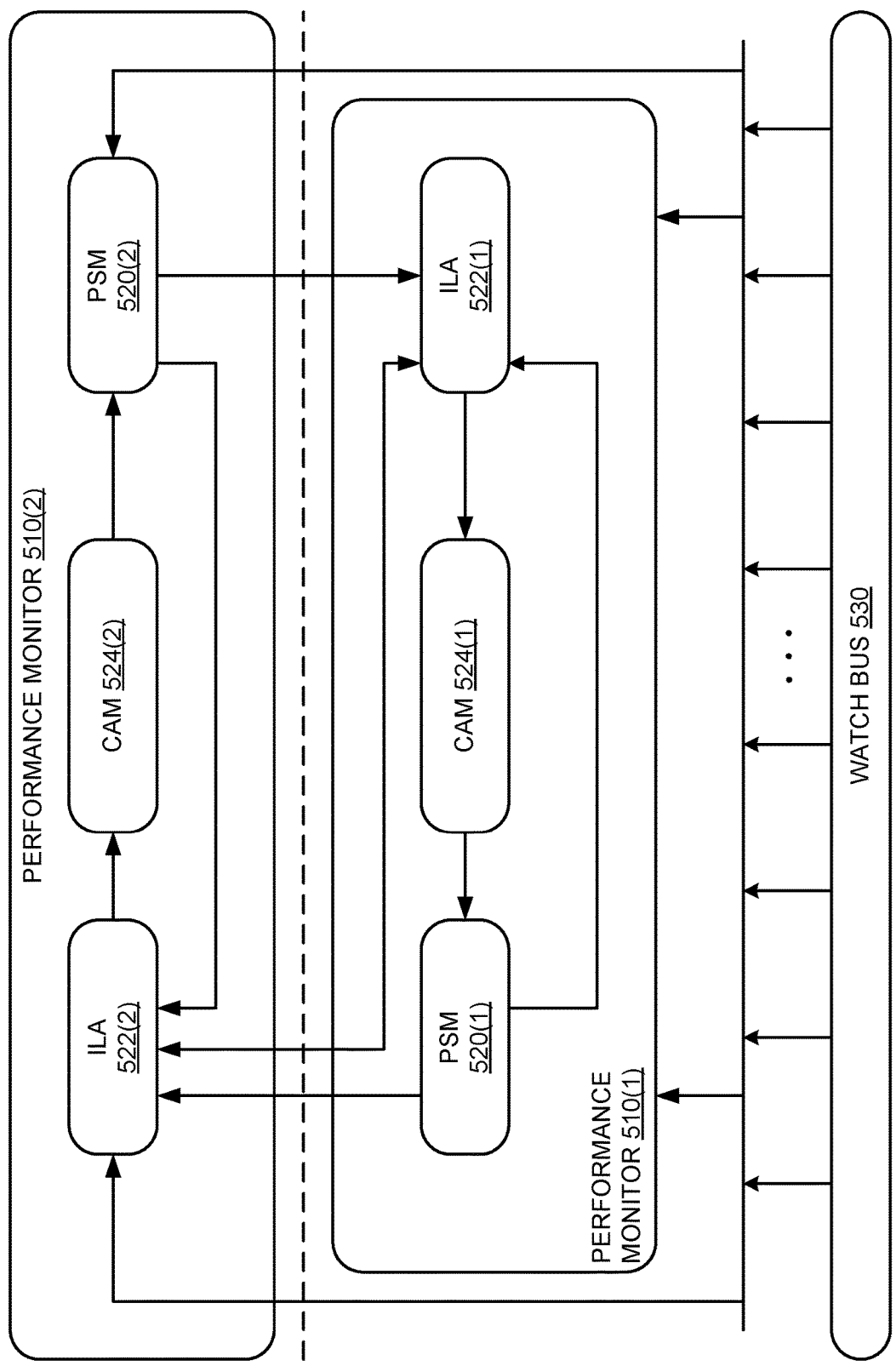
FIG. 5 is a block diagram of a performance monitoring system for the PPU of FIG. 2, according to various embodiments.

FIG. 5 is a block diagram of a performance monitoring system 500 for the PPU 200 of FIG. 2, according to various embodiments. As shown, the performance monitoring system 500 includes, without limitation, one or more performance monitors 510 (e.g., performance monitors 510(1) and 510(2) as shown) and a watch bus 530. Each performance monitor 510 can constitute a performance monitor module (PMM). Each GPC 242, each partition unit 262, and each sys pipe 230 includes at least one PMM. Accordingly, for example, performance monitor 510(1) could be included in a first GPC 242, and performance monitor 510(2) could be included in a second GPC 242. More generally, each of one or more domains to be monitored (e.g., each GPC 242, partition unit 262, sys pipe 230 and/or the like) in PPU 200 can be associated with a respective performance monitor 510. Each performance monitor 510 can include a watch bus 530, and/or multiple performance monitors 510 can share a common watch bus 530. The performance monitoring system 500 functions substantially the same as PM 236 of FIG. 2, PM 360 of FIG. 3, and PM 430, except as further described below. In various embodiments, PM 236, PM 360, and PM 430 are example instances of performance monitor 510.

Each performance monitor 510 includes a programmable state machine (PSM) 520, an internal logic analyzer (ILA) 522, and a content-addressable memory (CAM) 524. PSM 520 implements a state machine for the performance monitor. The state machine of the performance monitor defines one or more states, transitions between the states, and outputs associated with the states and/or transitions. ILA 522 can collect signal data from one or more domains to be monitored and perform operations to analyze the data. Within a given performance monitor, a CAM 524 stores data associated with PSM 520 and/or ILA 522; PSM 520 and ILA 522 shares CAM 524. ILA 522 is further described below in conjunction with FIGS. 10-12.

In some embodiments, a PSM can output one or more signals to the ILA within the same performance monitor and/or one or more ILAs of performance monitors for one or more other domains. Similarly, an ILA can receive one or more signals from the PSM within the same performance monitor, one or more PSMs of performance monitors for one or more other domains, and/or one or more ILAs of performance monitors for one or more other domains. For example, as shown, PSM 520(1) can output one or more output signals to ILA 522(1) and one or more output signals (which can be the same or different output signals) to ILA 522(2). Also as shown, ILA 522(1) can receive one or more signals from PSM 520(1) and/or PSM 520(2). Signals output by PSM 520 and signals received by ILA 522 are further described below. In some embodiments, a PSM 520 can output signals to multiple ILAs 522 (e.g., all ILAs 522 in performance monitoring system 500), and an ILA can receive signals from multiple PSMs 520 (e.g., all PSMs 520 in performance monitoring system 500).

Watch bus 530 receives signals from within PPU 200. Watch bus 520 can transmit one or more signals to PSMs 520 and one or more signals to ILAs 522. One or more signals transmitted to watch bus 530 can be connected as an input to one or more PSMs 520 and/or one or more ILAs 522. In some embodiments, watch bus 530 can group the received signals into one or more groups and transmit respective signal group(s) to PSMs 520 and/or ILAs 522.

Performance Monitor with Programmable State Machine

Figure 6:
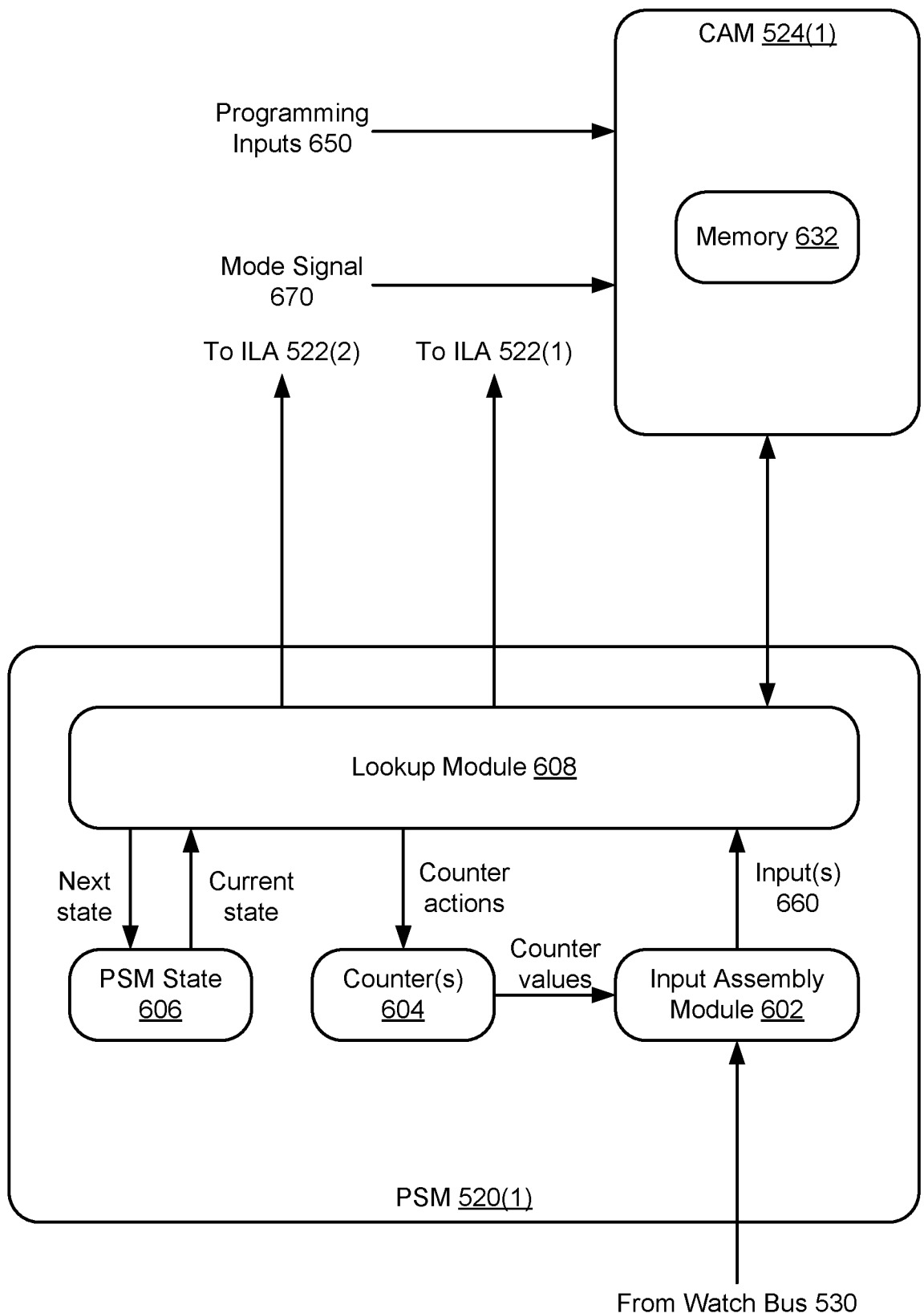
FIG. 6 illustrates a programmable state machine of the performance monitoring system of FIG. 5, according to various embodiments.

FIG. 6 illustrates a programmable state machine 520 of a performance monitor 510 of FIG. 5, according to various embodiments. Performance monitor 510 implements a programmable state machine (PSM) 520 via one or more hardware units and/or circuits, in conjunction with a content-addressable memory 524. FIG. 6 depicts a PSM 520(1) and a CAM 524(1) of performance monitor 510(1), but it should be appreciated that other PSMs 520 and CAMs 524 in PPU 200 can have a similar structure as that of PSM 520(1) and CAM 524(1), respectively, as shown. PSM 520(1), as shown, includes an input assembly module 602, counter(s) 604, PSM state 606, and a lookup module 608. CAM 524(1), as shown, includes a memory 632.

Input assembly module 602 receives signals from watch bus 530 and counters 604 and assembles and/or processes the signals into one or more input signals for lookup module 608. Input assembly module 602 implements any number and/or combination of logic circuits (e.g., logic gates, flip-flops, latches, multiplexers, registers, arithmetic logic units, Boolean function tables, memory, etc.) to process raw signals received from watch bus 530 to generate the input signal(s) for lookup module 608. Processing of the raw signals by the logic circuits can include, for example, selecting a raw signal from among a set of multiple raw signals, performing operations on one or more raw signals to generate an input signal, pass through a raw signal without processing, and/or the like. Input assembly module 602 generates one or more output signals that are connected as input(s) 660 into lookup module 608. Accordingly, the output of input assembly module 602 (and correspondingly input(s) 660 into lookup module 608) can be conceptualized as an arrangement (e.g., concatenation) of the output signals into a data word. In some embodiments, input assembly module 602 (including, for example, the raw signals from watch bus 520 that are received and processed, and the logic circuits included to process the raw signals, the output signals and the corresponding bit width) is defined at the design stage and is fixed in the hardware of PPU 200. In some other embodiments, input assembly module 602 can be implemented via programmable hardware (e.g., field-programmable gate array). In some embodiments, one or more counter values held in counters 604 can also be an additional input into input assembly module 602 and processed similarly by input assembly module 602 in conjunction with signals from watch bus 530. For example, one or more logic circuits within input assembly module 602 can generate an output signal based on one or more counters alone or based on one or more counters and one or more signals from watch bus 530.

Counter(s) 604 implement storage for storing and/or otherwise maintaining one or more counters that may be used by PSM 520(1). Counter(s) 604 further implements logic for performing one or more operations on the counters. Counter(s) 604 can include one or more logic circuits (e.g., registers, memory) for storing or holding values of the counter (s), and one or more logic circuits for performing operations (e.g., incrementing, decrementing, resetting to a predefined value, no operation (no-op), etc.) on the counters. In various embodiments, the logic circuits for performing the operations can be activated (e.g., triggered) by one or more outputs (e.g., one or more counter action values) from lookup module 608. Accordingly, one or more outputs of lookup module 608 can be connected as inputs into counters 604, in particular the logic circuits for performing operations on the counters. The counters held in counters 604 can be provided as inputs into input assembly module 602. Accordingly, outputs of the registers, memory, or the like holding the counters can be connected as inputs into input assembly module 602. Different values map to different operations, and accordingly, an operation to be performed can be selected by different values carried in the counter action values. Each of the counters in counters 604 can be one or more bits in bit width. In various embodiments, a counter in counters 604 counts a certain event (e.g., input signals matching certain values) that occur in the monitored domain. Accordingly, counters 604 can include one or more counters to count different types of events.

PSM state 606 implements storage for storing or holding a value indicating a current state of PSM 520(1). PSM 520 can have multiple states and transitions between the states, and each state can be represented by a value. For example, if PSM 520(1) has six total states, the states could be represented by, and numbered as, 1 thru 6. PSM state 606 can include one or more logic circuits (e.g., register(s), memory, a set of flip-flops) for storing or holding the current state value. For example, if the current state of PSM 520(1) is State 3, the current state value would then be 3. PSM state 606 can receive a next state value (a value indicating the next state to which PSM 520(1) transitions) and store that next state value as the new current state value. PSM state 606 can also provide the stored current state value as an input into lookup module 608; an output of PSM state 606 can be connected as an input into lookup module 608. The current state value stored in PSM state 606 can be any suitable bit width based on the number of states of PSM 520(1).

Lookup module 608 looks up and retrieves data associated with PSM 520(1) from CAM 524(1). In various embodiments, lookup module 608 implements logic circuits configured to retrieve data from CAM 524(1) based on inputs received from input assembly module 602 and the current state received from PSM state 606; an address into the CAM 524(1) is based on the input received from input assembly module 602 and on the current state. The data to be retrieved from CAM 524(1) includes a next state value to be output to PSM state 606, one or more counter action bits to be output to counters 604, and one or more other output signals, further described below in conjunction with FIG. 7. Lookup module 608 can output the next state value to PSM state 606, the counter action bits to counters 604, and the other output signals to other units within PPU 200, including for example an ILA within the same performance monitor (e.g., ILA 522(1)) and an ILA in a different performance monitor (e.g., ILA 522(2)).

CAM 524(1) includes a memory 632. Memory 632 stores data associated with PSM 520(1) or ILA 522(1). In some embodiments, memory 632 can be a latch-based memory or a register-based memory; memory 632 can be implemented using latches or registers. In those embodiments where memory 632 is a latch-based or register-based memory, lookup and retrieval of data stored in CAM 524 and output of signals by lookup module 608 based on the CAM data lookup and retrieval can be performed in the same clock cycle. Further, operations on counters 604 and updating of PSM state 606 based on the output signals can also be performed in the same clock cycle as the CAM data lookup and retrieval. Accordingly, PSM 520(1) can count instances of an event in a cycle-accurate manner in specific intervals determined by the user-programmed PSM, which can be beneficial for extracting specific information needed for analyzing the event. The format of data associated with PSM 520(1) or ILA 522(1) that can be stored in memory 632 are further described below with reference to FIGS. 7 and 11, respectively. In some embodiments, CAM 524(1) can include a controller interfacing with the latch-based or register-based memory 632. The controller can select between a PSM mode and an ILA mode, which are described below. In PSM mode, the controller performs the lookup and retrieval from memory 632; the controller implements the lookup module 608. The controller also can store the original PSM data as programmed by the user for possible re-writing back into memory 632. In some other embodiments, CAM 524(1) can be implemented with a controller and a random-access memory (RAM) for memory 632 (e.g., static RAM (SRAM)). The controller interfaces with the RAM and processes requests for lookups in the RAM.

In various embodiments, CAM 524(1) is connected to one or more additional signal inputs. These additional signal inputs can carry programming inputs 650, which can be activated by user command, into CAM 524(1). Programming inputs 650 can carry data associated with PSM 520(1) for storage into memory 632, replacing whatever is already stored therein. The programming inputs 650 can be provided by a user. By allowing the user to specify the PSM-associated data that are stored in CAM 524 and to provide that data into CAM 524 via programming inputs 650, PSM 520 is programmable to have the states, state transitions, and associated outputs desired by the user. Accordingly, PSM 520 can be easily configured for debugging and/or for feature expansion.

In some embodiments, CAM 524 operates in one of two modes: PSM mode and ILA mode. In PSM mode, CAM 524(1) stores data associated with PSM 520(1), provided by programming inputs 650, in memory 632. While in PSM mode, CAM 524(1) facilitates retrieval of that data by PSM 520(1). In ILA mode, ILA 522(1) can store data into CAM 524(1), overwriting the data associated with PSM 520(1). In some embodiments, CAM 524 initially operates in PSM mode unless triggered with a mode signal 670 to operate in ILA mode, and does not switch back into PSM mode until restarted (e.g., PPU 200 powers down and then back up). In embodiments where CAM 524 includes a controller, the controller can control access to memory 632 based on the active mode (PSM mode or ILA mode). The controller initially operates in the PSM mode, and the mode can be changed to an ILA mode based on a mode signal 670 input into CAM 524. The mode signal input 670 can be, for example, a DFD trigger, which is described below.

In some embodiments, CAM 524 can store up to 32 entries in its memory 632; CAM 524 is sized within PPU 200 to allow a 32-entry memory 632. A 32-entry memory 632 can store up to 32 state transitions (each entry corresponding to a state transition) for the PSM. More generally, the storage capacity of CAM 524 is limited by the amount of physical area within PPU 200 that is allocated to CAM 524; memory 623 is physically sized within PPU 220 based on that allocated physical area. The number of entries that CAM 524 can store is not dependent on the number of states of the PSM or the number of inputs into the PSM. The bit width of entries in CAM 524 can depend on the number of inputs into the PSM (e.g., wider entries to allow for more input signals).

For embodiments where memory 632 is a RAM, the RAM can store a number of entries based on the number of inputs into the PSM and the number of bits for the PSM state value (e.g., $2^m$ entries, where m is the sum of the number of inputs into the PSM and the number of bits for the PSM state value). The bit width of entries in the RAM does not depend on the number of inputs. The controller would process lookups in the RAM, looking up one entry in the RAM per clock cycle. With 8 possible states (3-bit PSM state value) and 5 inputs, the RAM would need sufficient capacity to store at least 256 entries ($2^{(3+5)}$).

Figure 7:
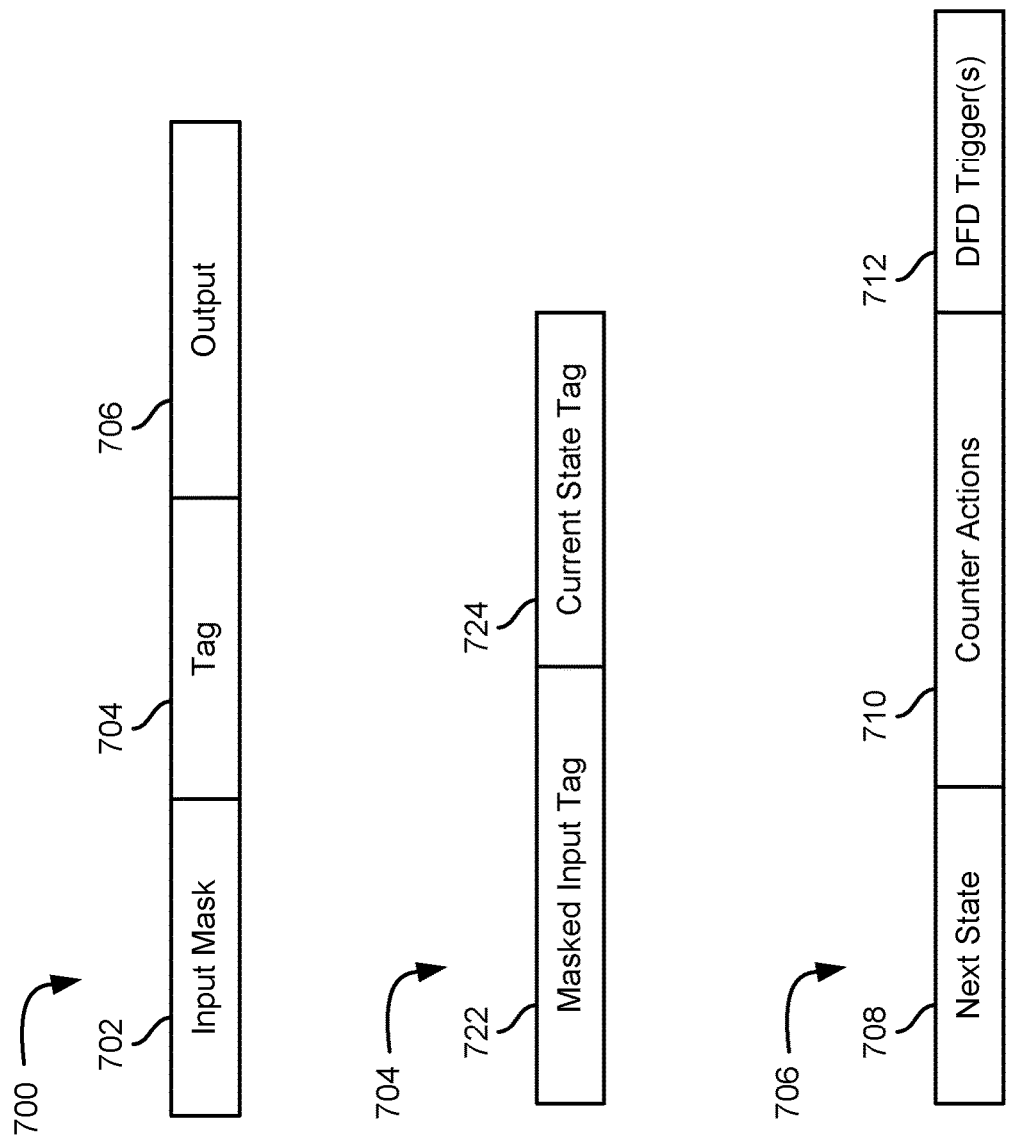
FIG. 7 illustrates a format of an entry in a content-addressable memory storing data associated with the programmable state machine of FIG. 6, according to various embodiments.

FIG. 7 illustrates a format 700 of an entry that can be stored in a content-addressable memory 524 associated with the programmable state machine 520 of FIG. 6, according to various embodiments. Entries associated with PSM 520 that are stored in CAM 524 can have the PSM entry format 700 as shown. The format 700 for a PSM entry includes an input mask 702, a tag 704, and output 706.

Input mask 702 is a data word that can be used to mask certain bits in input 660. Input mask 702 has the same bit width as input 660. Each bit digit in input mask 702 can be 0 or 1 depending on whether the corresponding bit position in input 660 is to be masked away or not.

Tag 704 is a data word, of multiple bits, used to look up entries stored in CAM 524. As further described below with reference to FIG. 8, tag 704 includes a masked input tag 722 and a current state tag 724. The masked input tag 722 is compared to the masked input, and the current state tag 724 is compared to the current state value. Based on these comparisons (e.g., whether the masked input is equal to the masked input tag 722 and the current state value is equal to the current state tag 724), a matching entry stored in CAM 524 can be identified and a corresponding output 706 be retrieved. In various embodiments, a given entry with format 700 corresponds to a given state transition; the input mask 702 and tag 704 specifies input signal and current state conditions for a transition, and the output 706 specifies a next state to transition to and output signals in response to the transition.

Output 706 includes the next state for PSM 520 to transition and output signals associated with that transition to the next state. As shown, output 706 includes a next state 708, counter actions 710, and DFD trigger(s) 712. Next state 708 is the value indicating the next state for the PSM 520, and has the same bit width as current state value stored in PSM state 606. Counter actions 710 include one or more bits that are input into counters 604 to activate one or more operations on the counters. Counter actions 710 can be any suitable bit width. In some embodiments, for a given counter, counter actions 710 can include one or more bits indicating the operation to be performed (e.g., increment, decrement, reset, no-op, etc.) and one or more additional bits indicating a value associated with the operation (e.g., a value by which to increment or decrement the counter, a value to which to reset the counter). In some other embodiments, the value associated with the operation is predefined, and counter actions 710 just include the bit(s) indicating the operation to be performed.

DFD (design-for-debugging) trigger(s) 714 includes one or more bits that can be used to trigger DFD features in PPU 200. DFD trigger 714 can be inputs in DFD-related hardware units within PPU 200. In some embodiments, DFD trigger(s) 714 can trigger one or more local and/or non-local ILAs in one or more performance monitors 510. When triggered, an ILA 522 activates to assemble and store signal data over time for further analysis. The ILA also can be triggered to cease assembling and storing signal data. Further, in some embodiments, DFD trigger(s) 714 can additionally include a mode signal 670 that can be output to a local or non-local CAM 524 to change the mode of the CAM 524 from PSM mode to ILA mode. In some embodiments, DFD trigger(s) 714 can further include a signal pattern (e.g., a string or data word of bits). The signal pattern specifies a set of signal values to which signal data should match in order to be stored. More generally, DFD trigger(s) 714 can trigger various types of DFD events, including and without limitation, triggering an ILA, triggering a clock stop, etc. A clock stop trigger, for example, can be output to a clock of a domain to stop the clock associated with the domain, thereby preserving the state of the hardware within that the domain. Further, in some embodiments, a PSM 520 or ILA 522 receiving a DFD trigger can respond to the trigger or ignore the trigger.

Figure 8:
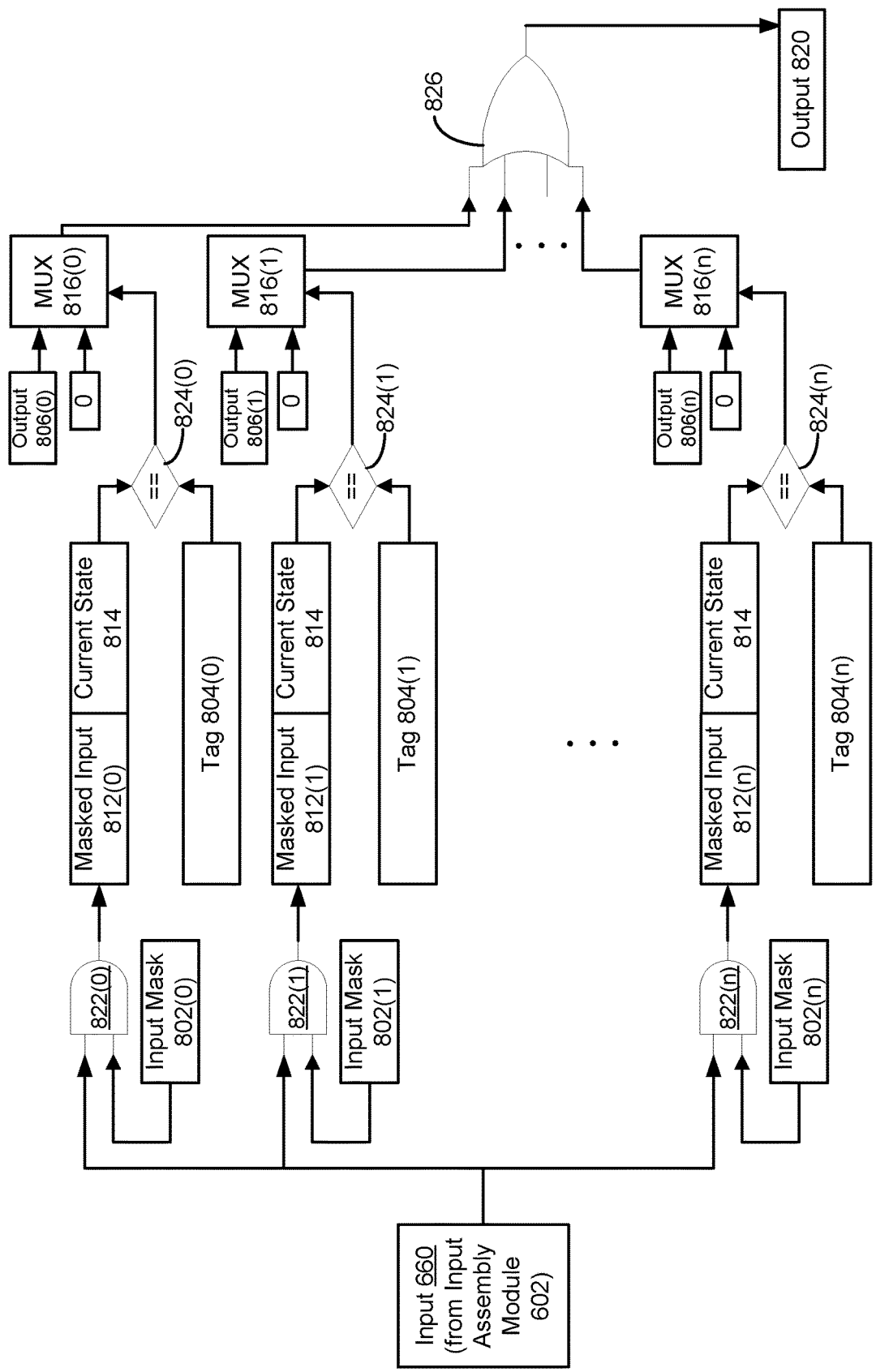
FIG. 8 illustrates a diagram of the lookup module of the programmable state machine of FIG. 6, according to various embodiments.

FIG. 8 illustrates a diagram of the lookup module 608 of the programmable state machine 520 of FIG. 6, according to various embodiments. As described above, lookup module 608 can obtain data from CAM 524 based on the input received from input assembly module 602 and the current state of PSM 520. The obtained data includes the next state for the PSM 520 to transition and outputs associated with the transition to the next state. Accordingly, lookup module 608 facilitates state transition by PSM 520 and outputting of signals in accordance with the state transition by PSM 520.

It should be appreciated that FIG. 8 illustrates an example arrangement and combination of logic circuits used to implement the functionality of lookup module 608. In implementation, the described functionality can be implemented with any technically feasible arrangement and/or combination of logic circuits. Further, it should be appreciated that while FIG. 8 illustrates operations at a data word level, the same functionality can be implemented via operations at the bit digit level (e.g., bit-by-bit logic circuits and operations).

As shown, input 660 from input assembly module 602 are first masked by input masks 802 obtained from CAM 524. Input masks 802 follow the format of input mask 702 described above. Input 660 is respectively masked by input masks 802(0)-802(n) via AND gates 822(0)-822(n) to yield masked inputs 812(0)-812(n). The masking of input 660 by input masks 802 via AND gates 822 can be concurrent.

Masked inputs 812 and the current state 814 (retrieved from PSM state 606) are compared to tags 804 obtained from CAM 524. Tags 804 follows the format of tag 704 described above. The comparison, performed by an equality comparator 824, determines whether a masked input 812 is equal to the masked input tag 722 within a tag 804, and whether the current state 814 is equal to the current state tag 724 within the tag 804. Accordingly, comparator 824(0) compares masked input 812(0) to the masked input tag within tag 804(0), and current state 814 to the current state tag within tag 804(0). Comparator 824(1) compares masked input 812(1) to the masked input tag within tag 804(1), and current state 814 to the current state tag within tag 804(1), and so on up to comparator 824(n), masked input 812(n), and tag 804(n). A comparator 824 outputs a 1 if the masked input 812 is determined to be equal to the masked input tag within a tag 804 and the current state 814 is determined to be equal to the current state tag within the tag 804, and a 0 otherwise. Thus, for example, comparator 824(0) outputs a 1 if masked input 812(0) is equal to the masked input tag within tag 804(0) and current state 814 is equal to the current state tag within tag 804(0), and outputs a zero otherwise. The outputs of comparators 824 are provided to respective multiplexes 816 as a selection input. The comparison of the comparator inputs by comparators 824 can be concurrent.

Each multiplexer 816 select one of two data inputs into the multiplexer based on the output received from a comparator 824. In some embodiments, data inputs into a multiplexer 816 include an output 806 stored in CAM 524 and a zero value. Outputs 806 follow the format of output 706 described above. If the output from the comparator 824 is 0 (the inputs into the comparator 824 are not equal), then the multiplexer 816 selects the 0 value. If the output from the comparator 824 is 1 (the inputs into the comparator 824 are equal), then the multiplexer 816 selects the output 806. Accordingly, multiplexer 816(0) selects one of output 806(0) or zero value (0) based on the output from comparator 824(0), multiplexer 816(1) selects one of output 806(1) or 0 based on the output from comparator 824(1), and so on. The selection operation performed by multiplexers 816 can be concurrent, and each multiplexer 816 outputs either an output 806 or a zero value.

The outputs of the multiplexers 816 are provided into an OR gate 826. The OR gate 826 assembles the outputs of multiplexers 816 into an output 820 of the lookup module 608. Lookup module 608 can output respective bit digits in output 820 to other components in PSM 520. For example, the next state 708 within output 820 is provided to PSM state 606, counter actions 710 within output 820 are provided to counters 604, and DFD triggers 712 within output 720 is provided to any number of DFD-associated units, PSMs, and/or ILAs within PPU 200.

In some embodiments, n is equal to the number of data entries associated with the PSM 520 that are stored in CAM 524. Each data entry associated with the PSM includes an input mask 802, tag 804, and output 806; and includes a condition for transitioning to a next state (e.g., certain input signals and the current state having specified values), the next state to transition, and outputs associated with that transition. Thus, lookup module 608 can, with an input 660 and the current state 814, can check each possible state transition condition stored in CAM 524, determine the condition that is satisfied, and obtain the corresponding next state transition and associated outputs.

In various embodiments, in the normal operation of PSM 520, a given input 660 and a given current state 814 should result in just one matching tag 804. That is, in normal operation, based on the outputs of comparators 824, just one multiplexer amongst multiplexers 816 outputs an output 806 and the other multiplexers output zero values. Accordingly, the output 820 follows the format of output 706 and should be the same as one of the outputs 806(0)-806(n). If multiple multiplexers 816 select an output 806 for output to OR gate 826, then that may be indicative of buggy (e.g., erroneous, ill-designed) data entries stored in CAM 524. In some embodiments, lookup module 608 can detect such a condition (of multiple multiplexers 816 outputting an output 806)

and output an error signal to alert the user to take debugging action (e.g., to debug the state transition conditions in the data entries and to overwrite the data entries in CAM 824 with debugged data entries via programming inputs 650).

In some embodiments, PSM 520, upon start-up, initially starts in an idle or stand-by state and remains in the idle or stand-by state regardless of the input 660 until a user-activated state transition trigger signal forces a state transition to a different, state. PSM 520 can receive the user-activated include logic circuitry (not shown) configured to receive that state transition trigger signal as an input and to transition to a different state in accordance with the state transition trigger signal.

Figure 9:
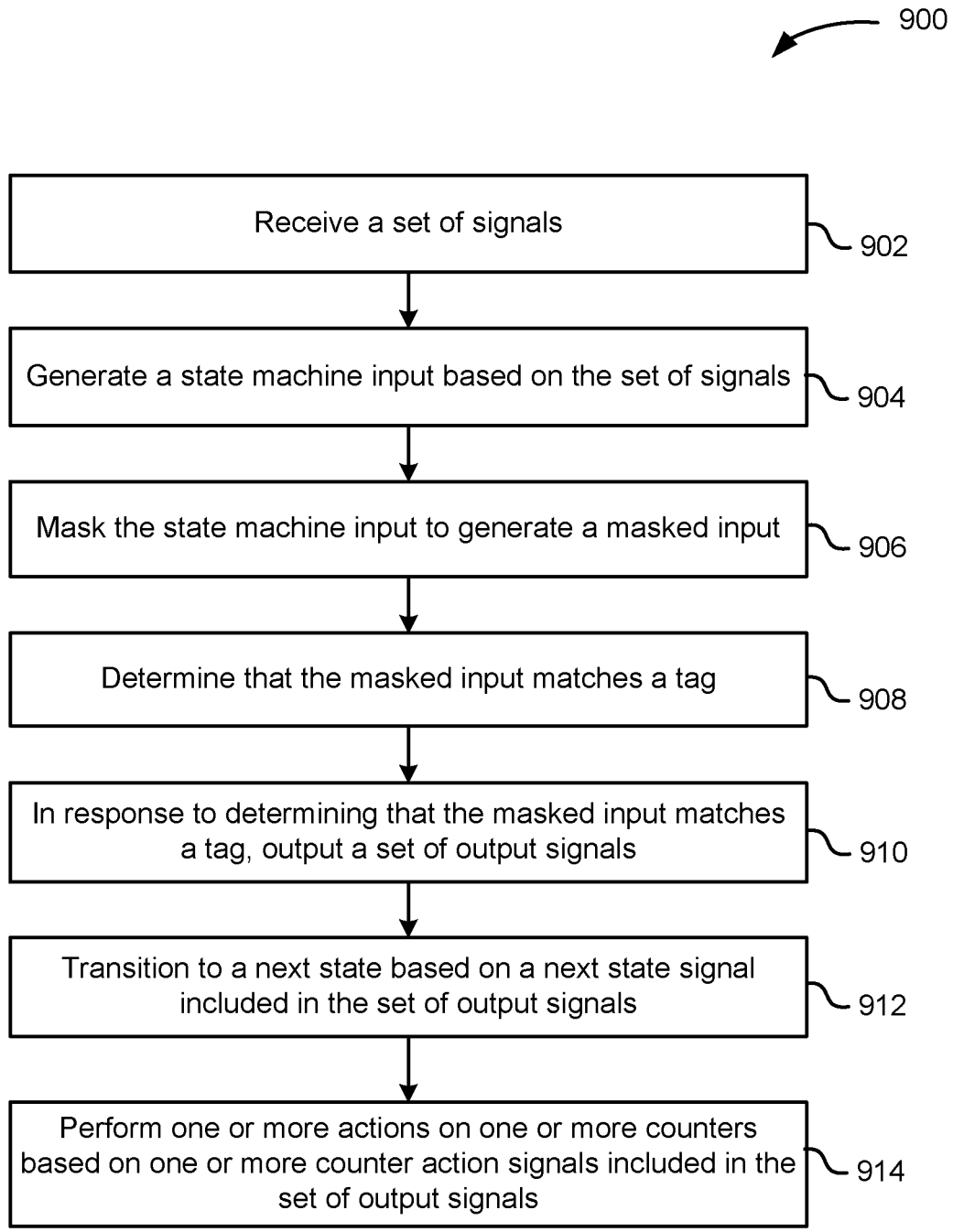
FIG. 9 is a flow diagram of method steps for monitoring performance via a programmable state machine, according to various embodiments.

FIG. 9 is a flow diagram of method steps for monitoring performance via a programmable state machine, according to various embodiments. Although the method steps are described in conjunction with the systems of FIGS. 1-8, persons of ordinary skill in the art will understand that any system configured to perform the method steps, in any order, is within the scope of the present disclosure.

As shown, a method 900 begins at step 902, where a performance monitor 510 receives a set of signals. PSM 520 can receive a set of signals from watch bus 530.

At step 904, performance monitor 510 generates a state machine input based on the set of signals. PSM 520 (e.g., input assembly module 602) processes the signals received from watch bus 530 and optionally additional signals (e.g., counters 604) to generate an input 660.

At step 906, performance monitor 510 masks the state machine input to generate a masked input. PSM 520 (e.g., lookup module 608) masks input 660 with an input mask 802 to generate a masked input 812. In some embodiments, PSM 520 can mask input 660 with respective multiple input masks 802 concurrently to generate multiple masked inputs 812.

At step 908, performance monitor 510 determines that the masked input matches a tag. PSM 520 (e.g., lookup module 608) can determine that the masked input matches a masked input tag 722 within one of tags 804. PSM 520 additionally determines that the current state 814 matches the current state tag 724 within one of tags 804. In various embodiments, each masked input 812 is respectively combined (e.g., concatenated) with the current state 814 and the combinations are compared to corresponding tags 804 via comparators 824.

At step 910, in response to determining that the masked input matches a tag, performance monitor 510 outputs a set of output signals. PSM 520 (e.g., lookup module 608) outputs an output 820 based on match between a masked input 812 and the current state 814 to a tag 804. The output 820 includes a next state 708, counter actions 710, and a DFD trigger 712.

At step 912, performance monitor 510 transitions to a next state based a next state signal included in the set of output signals. PSM 520 provides the next state 708 included in output 820 to PSM state 606. The PSM state 606 stores the next state 708, replacing the current state value. The replacing of the current state value with the next state 708 (the new current state value) corresponds to a transition by PSM 520 from one state to another.

At step 914, performance monitor 510 performs one or more actions on one or more counters based on one or more counter action signals included in the set of output signals. PSM 520 provides the counter actions 710 included in output 820 to counters 604. The counters 604 performs the operations (e.g., increment, decrement, reset, no-op, etc.) indicated by the values in the counter actions 710.

Internal Logic Analyzer with Shared Storage

Figure 10:
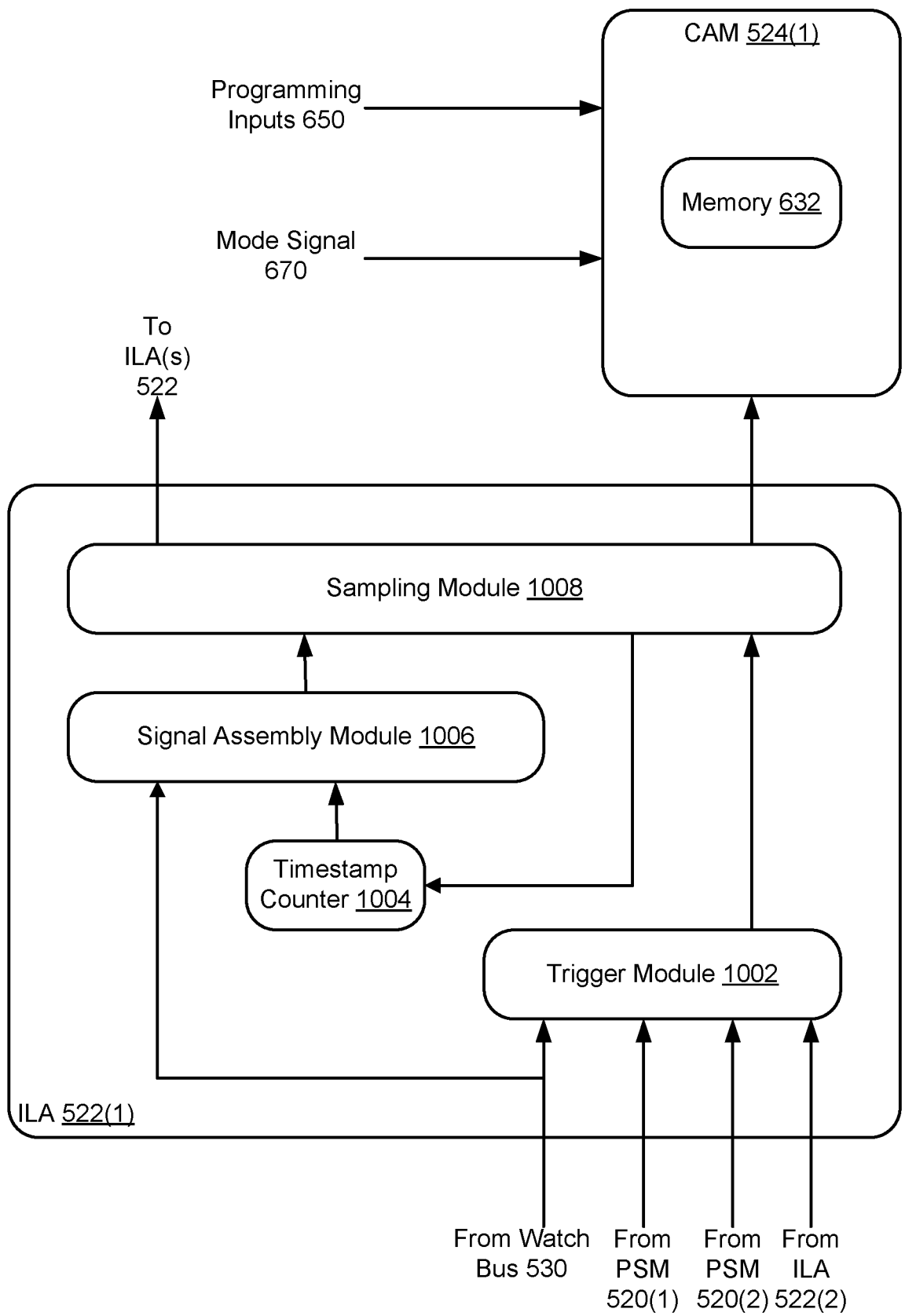
FIG. 10 illustrates an internal logic analyzer of the performance monitoring system of FIG. 5, according to various embodiments.

FIG. 10 illustrates an internal logic analyzer of the performance monitoring system of FIG. 5, according to various embodiments. Performance monitor 510 implements an internal logic analyzer (ILA) 522 via one or more hardware units and/or circuits, in conjunction with a content-addressable memory 524 and optionally a PSM 520. FIG. 10 depicts an ILA 522 (1) and a CAM 524(1) of performance monitor 510(1), but it should be appreciated that other ILAs 520 and CAMs 524 in PPU 200 can have a similar structure as that of ILA 520(1) and CAM 524(1), respectively, as shown. ILA 520(1), as shown, includes a trigger module 1002, timestamp counter 1004, signal assembly module 1006, and a sampling module 1008. CAM 524(1), as shown, includes a memory 632 as described above with reference to FIG. 6.

Trigger module 1002 implements one or more logic circuits that activate or deactivate signal data collection by ILA 522(1) based on one or more input signals. Inputs into trigger module 1002 can include one or more signals from watch bus 530, and trigger signals (e.g., DFD trigger 712) from a local PSM (e.g., PSM 520(1)), a non-local PSM (e.g., PSM 520(2)), and/or one or more other ILAs 522 (e.g., ILA 522(2)). The logic circuits process these input signals to determine whether the input signals meet a trigger condition. If the trigger condition is met, trigger module 1002 outputs a signal to sampling module 1008 to activate or deactivate signal data collection, depending on the trigger condition that is met. Accordingly, ILA 522 can operate in conjunction with a local and/or a non-local PSM 520 and/or one or more other ILAs 522. In some embodiments, trigger module 1002 can also output a signal pattern received from a DFD trigger to sampling module 1008.

Timestamp counter 1004 stores a counter that corresponds to a timestamp. Timestamp counter 1004 includes storage (e.g., register) to hold the timestamp counter value, and logic circuits to perform operations on the timestamp counter value (e.g., increment, reset). In some embodiments, timestamp counter 1004 includes a clock. The logic circuits for timestamp counter 1004 can perform an operation automatically (e.g., automatically increment counter each microsecond) or in response to an input signal into timestamp counter 1004. Timestamp counter 1004 can output a current timestamp counter value to signal assembly module 1006.

Signal assembly module 1006 assembles input signals into data words (or portions of data words) for storage in CAM 524(1). Signal assembly module 1006 assembles and/or arranges one or more signals from watch bus 530, and optionally additional signals (e.g., one or more flag signals, one or more counter values), into a data word portion and concatenates that portion to a timestamp counter value obtained from timestamp counter 1004, thereby generating a data word. Accordingly, signal assembly module 1006 generates a data word based on signals from watch bus 530 and a corresponding timestamp counter value. Signal assembly module 1006 can include any suitable logic circuit(s) for assembling the signals and generating the data word. Signal assembly module outputs the data word to sampling module 1008. A format for the data words generated by signal assembly module 1006 is described below with reference to FIG. 11.

Sampling module 1008 samples data words generated by signal assembly module 1006 and stores the sampled data words into CAM 524(1) that is operating in ILA mode. In response to an activation signal from trigger module 1002, sample module 1008 stores data words received from signal assembly module 1006 into CAM 524. Sampling module 1008 can determine which data words to sample for storage in CAM 524(1) based on a signal pattern (e.g., a signal pattern received from trigger module 1002). In some embodiments, sampling module 1008 can implement logic circuits that check whether data words received from signal assembly module 1006, not including the timestamps, matches the signal pattern, and samples for storage into CAM 524(1) those data words that match the signal pattern while discarding those that do not match the signal pattern. Sampling module 1008 outputs the sampled data words to CAM 524(1), which stores the sampled data words in memory 632, overwriting any PSM-associated data entries in memory 632. In some embodiments, sampling module 1008 can output a trigger signal to other ILAs 522. The trigger signal can be a trigger similar to a DFD trigger and can trigger the other ILA(s) 522 to, for example, start or stop storing data into a CAM 524. Sampling module 1008 can output the trigger signal in response to satisfaction of one or more conditions (e.g., CAM 524(1) is full with data from sampling module 1008).

When memory 632 is fully filled with stored data words from sampling module 1008 (i.e., all of the PSM-associated data entries are replaced with data words from sampling module 1008), in some embodiments CAM 524(1) can signal the sampling module 1008 that memory 632 is full and to stop sampling data words. In response to the memory 632 being full, sampling module 1008 can signal stop sampling data words and signal timestamp counter 1004 to reset. In some other embodiments, CAM 524(1) can continue to store sampled data words into memory 632 after the memory 632 is full with data words, overwriting the oldest data word.

CAM 524, after operating in ILA mode, can be switched back to PSM mode via a mode signal 670. Because one or more PSM-associated data entries in memory 632 have been overwritten, a user can activate a programming input 650 to re-fill CAM 524 with PSM-associated data entries (e.g., to restore the programming of PSM 520).

In some embodiments, ILA 522 includes additional logic circuits (not shown) for performing analyses on the data words sampled by sampling module 1008 and stored in CAM 524. The logic circuits can retrieve the data words from CAM 524. Additionally or alternatively, other units in PPU 200 can retrieve the data words from CAM 524 to perform analyses on the data words.

Figure 11:
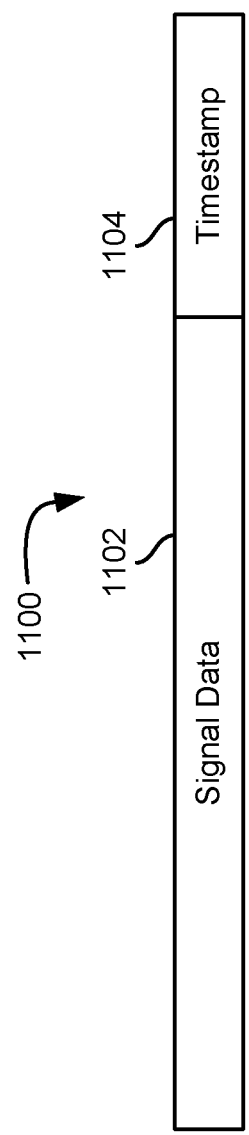
FIG. 11 illustrates a format of an entry in a content-addressable memory storing data for the internal logic analyzer of FIG. 10, according to some embodiments.

FIG. 11 illustrates a format of an entry in a content-addressable memory storing data for the internal logic analyzer of FIG. 10, according to some embodiments. CAM 524 can store data words, generated by signal assembly module 1006 and sampled by sampling module 1008, that are data entries associated with ILA 522. The format 1100 for the data word includes signal data 1102 and timestamp 1104. Signal data 1102 includes signals received from watch bus 530 and/or other signals (e.g., flags, counters). Timestamp 1104 includes a timestamp counter value obtained from timestamp counter 1004.

Figure 12:
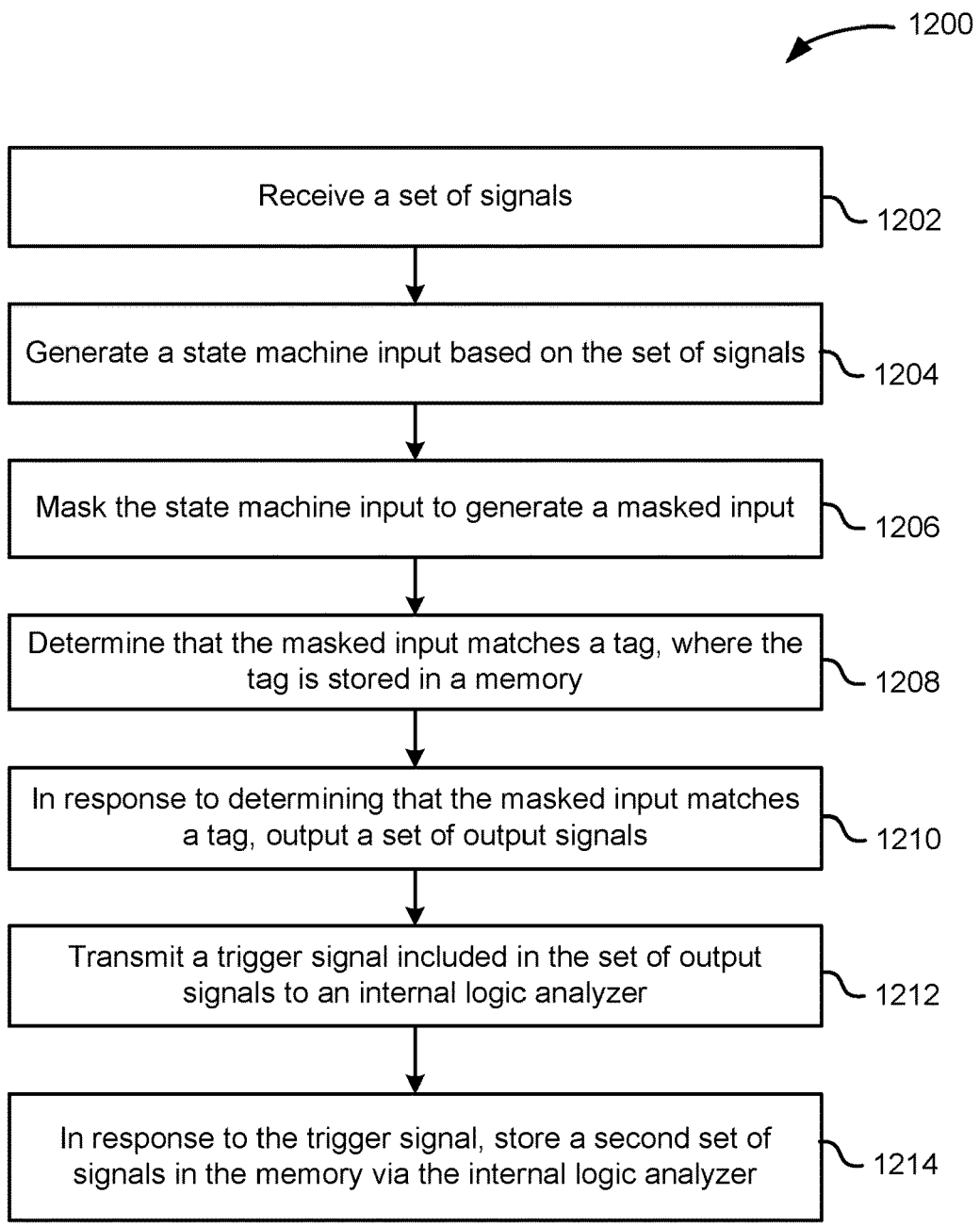
FIG. 12 is a flow diagram of method steps for triggering an internal logic analyzer via a programmable state machine, according to various embodiments.

FIG. 12 is a flow diagram of method steps for triggering an internal logic analyzer via a programmable state machine, according to various embodiments. Although the method steps are described in conjunction with the systems of FIGS. 1-11, persons of ordinary skill in the art will understand that any system configured to perform the method steps, in any order, is within the scope of the present disclosure.

As shown, a method 1200 begins at step 1202, where a performance monitor 510 receives a set of signals. PSM 520 can receive a set of signals from watch bus 530.

At step 1204, performance monitor 510 generates a state machine input based on the set of signals. PSM 520 (e.g., input assembly module 602) processes the signals received from watch bus 530 and optionally additional signals (e.g., counters 604) to generate an input 660.

At step 1206, performance monitor 510 masks the state machine input to generate a masked input. PSM 520 (e.g., lookup module 608) masks input 660 with an input mask 802 to generate a masked input 812. In some embodiments, PSM 520 can mask input 660 with respective multiple input masks 802 concurrently to generate multiple masked inputs 812.

At step 1208, performance monitor 510 determines that the masked input matches a tag, where the tag is stored in a memory. PSM 520 (e.g., lookup module 608) can determine that the masked input matches a masked input tag 722 within one of tags 804 obtained from CSM 524. PSM 520 additionally determines that the current state 814 matches the current state tag 724 within one of tags 804 obtained from CSM 524. In various embodiments, each masked input 812 is respectively combined (e.g., concatenated) with the current state 814 and the combinations are compared to corresponding tags 804 obtained from CSM 524 via comparators 824.

At step 1210, in response to determining that the masked input matches a tag, performance monitor 510 outputs a set of output signals. PSM 520 (e.g., lookup module 608) outputs an output 820 based on match between a masked input 812 and the current state 814 to a tag 804. The output 820 includes a next state 708, counter actions 710, and a DFD trigger 712.

At step 1212, performance monitor 510 transmits a trigger signal included in the set of output signals to an internal logic analyzer. PSM 520 outputs an ILA trigger (e.g., DFD trigger 712) included in output 820 to a local or non-local ILA 522.

At step 1214, in response to the trigger signal, performance monitor 510 stores a second set of signals in the memory via the internal logic analyzer. ILA 522, in response to the trigger received from PSM 520, samples and stores into CAM 524 one or more data words generated from signals received from watch bus 530. The data words replace whatever contents are stored in CAM 524 (e.g., PSM-associated entries).

The techniques disclosed herein may be used with any accelerator or processor that can presently or in the future include a hardware performance monitor within the accelerator or processor including, for example, a central processing unit (CPU), a graphics processing unit (GPU), an intelligence processing unit (IPU), neural processing unit (NPU), tensor processing unit (TPU), neural network processor (NNP), a data processing unit (DPU), a vision processing unit (VPU), an application specific integrated circuit (ASIC), a configured field-programmable gate array (FPGA), and the like.

In sum, a hardware performance monitor can implement a programmable state machine. The programmable state machine includes information on states, transitions, and outputs that are stored in a storage unit. The programmable state machine operates by generating a state machine input based on a set of input signals and looking up the information in the storage unit using the state machine input to retrieve the appropriate state, transition, and outputs. The programmable state machine can be reprogrammed by writing new information into the storage unit.

One technological advantage of the disclosed techniques relative to the prior art is that a state machine of a performance monitor can be more flexibly modified to add and/or repair functionality. Accordingly, new features and/or bug fixes can be more easily provided to deployed processing units, thereby avoiding disablement and/or abandonment of performance monitoring functionality or even entire processing units. Another technological advantage is that, because functionality and/or fixes are more easily provided, the feature divergence between different versions of the same hardware (e.g., between a manufacturing batch prior to a bug fix and a batch after the bug fix) is reduced. These technological advantages represent one or more technological advancements over prior art approaches.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:
   receiving a set of one or more signals;
   generating a first input based on the set of one or more signals and a first input mask associated with a first state transition condition, wherein the first input mask and the first state transition condition are stored in a first data entry in a memory associated with a performance monitor;
   determining, based on the first input and a current state, that the first state transition condition is satisfied; and
   in response to determining that the first state transition condition is satisfied, transitioning the performance monitor from the current state to a first state, wherein the first state is stored in the memory and associated with the first state transition condition.

2. The method of claim 1, wherein the first state transition condition comprises a tag.

3. The method of claim 2, wherein determining that the first state transition condition is satisfied comprises determining that a combination of the first input and the current state matches the tag.

4. The method of claim 3, wherein the tag comprises a first portion for comparison to the first input and a second portion for comparison to the current state.

5. The method of claim 1, further comprising:
   in response to determining that the first state transition condition is satisfied, performing an operation on a counter.

6. The method of claim 4, wherein the first data entry comprises one or more output signals including a signal indicating the operation to perform on the counter, and wherein performing the operation on the counter comprises transmitting the signal indicating the operation to perform on the counter to a logic circuit configured to perform the operation on the counter.

7. The method of claim 1, wherein the first data entry further comprises a trigger signal, the method further comprising:
   in response to determining that the first state transition condition is satisfied, outputting the trigger signal to a logic analyzer.

8. The method of claim 1, further comprising:
   receiving a second set of one or more signals;
   generating a second input based on the second set of one or more signals and a second input mask associated with a second state transition condition, wherein the second input mask and the second state transition condition are stored in a second data entry in the memory;
   determining, based on the second input and the first state, that the second state transition condition is satisfied; and
   in response to determining that the second state transition condition is satisfied, transitioning the performance monitor from the first state to a second state, wherein the second state is stored in the memory and associated with the second state transition condition.

9. The method of claim 1, wherein the memory comprises a content-addressable memory.

10. The method of claim 1, further comprising replacing the first data entry in the memory with a second data entry, wherein the second data entry comprises a second state transition condition and a second input mask.

11. A system, comprising:
    a processor comprising a set of logic circuits associated with a state machine; and
    a memory included in the processor;
    wherein the processor:
       receives, via the set of logic circuits, a set of one or more signals;
       generates, via the set of logic circuits, a first input based on the set of one or more signals and a first input mask associated with a first state transition condition, wherein the first input mask and the first state transition condition are stored in a first data entry in the memory;
       determines, via the set of logic circuits, based on the first input and a current state, that the first state transition condition is satisfied; and
       in response to determining that the first state transition condition is satisfied, transitions, via the set of logic circuits, the processor from the current state to a first state, wherein the first state is stored in the memory and associated with the first state transition condition,
       wherein the first state transition condition, the current state, and the first state are associated with the state machine.

12. The system of claim 11, wherein the memory comprises a content-addressable memory.

13. The system of claim 11, wherein the processor replaces the first data entry in the memory with a second data entry, wherein the second data entry comprises a second state transition condition associated with the state machine and a second input mask.

14. The system of claim 11, wherein the processor, in response to determining that the first state transition condition is satisfied, performs, via the set of logic circuits, an operation on a counter associated with the state machine.

15. The system of claim 14, wherein the first data entry comprises one or more output signals, the one or more output signals including a signal indicating the operation to perform on the counter, wherein the processor comprises a logic circuit associated with the counter, and wherein performing the operation on the counter comprises transmitting the signal indicating the operation to perform on the counter to the logic circuit associated with the counter.

16. The system of claim 11, wherein the first data entry further comprises a trigger signal, wherein the processor comprises a logic analyzer; and wherein the processor, in response to determining that the first state transition condition is satisfied, further outputs, via the set of logic circuits, the trigger signal to the logic analyzer.

17. The system of claim 11, wherein the processor:
    receives, via the set of logic circuits, a second set of one or more signals;
    generates, via the set of logic circuits, a second input based on the second set of one or more signals and a second input mask associated with a second state transition condition, wherein the second input mask and the second state transition condition are stored in a second data entry in the memory;
    determines, via the set of logic circuits, based on the second input and the first state, that the second state transition condition is satisfied; and
    in response to determining that the second state transition condition is satisfied, transitions, via the set of logic circuits, the processor from the first state to a second state, wherein the second state is stored in the memory and associated with the second state transition condition.

18. A non-transitory computer-readable medium storing program instructions that, when executed by a processor, cause the performance monitor to perform the steps of:
    receiving a set of one or more signals;
    generating a first input based on the set of one or more signals and a first input mask associated with a first state transition condition, wherein the first input mask and the first state transition condition are stored in a first data entry in a memory associated with a performance monitor;
    determining, based on the first input and a current state, that the first state transition condition is satisfied; and
    in response to determining that the first state transition condition is satisfied, transitioning the performance monitor from the current state to a first state, wherein the first state is stored in the memory and associated with the first state transition condition.

19. The non-transitory computer-readable medium of claim 18, wherein the memory comprises a content-addressable memory.

20. The non-transitory computer-readable medium of claim 18, wherein the steps further comprise replacing the first data entry in the memory with a second data entry, wherein the second data entry comprises a second state transition condition and a second input mask.

* * * * *